(12) United States Patent
Kinoshita et al.

(10) Patent No.: US 8,456,132 B2
(45) Date of Patent: Jun. 4, 2013

(54) SECONDARY BATTERY SYSTEM

(75) Inventors: Takuya Kinoshita, Yokosuka (JP); Yoshio Shimoida, Yokosuka (JP)

(73) Assignee: Nissan Motor Co., Ltd., Yokohama-shi, Kangawa (JP)

( * ) Notice: Subject to any disclaimer, the term of this patent is extended or adjusted under 35 U.S.C. 154(b) by 184 days.

(21) Appl. No.: 13/131,917

(22) PCT Filed: Dec. 15, 2009

(86) PCT No.: PCT/IB2009/007776
§ 371 (c)(1),
(2), (4) Date: May 31, 2011

(87) PCT Pub. No.: WO2010/070423
PCT Pub. Date: Jun. 24, 2010

(65) Prior Publication Data
US 2011/0234162 A1    Sep. 29, 2011

(30) Foreign Application Priority Data

Dec. 19, 2008   (JP) .................................. 2008-324082
Sep. 7, 2009    (JP) .................................. 2009-206126

(51) Int. Cl.
*H02J 7/00*   (2006.01)
(52) U.S. Cl.
USPC ........... 320/116; 320/128; 320/132; 320/134; 320/136

(58) Field of Classification Search
CPC ....................................................... Y02E 60/12
USPC .......................................................... 320/116
See application file for complete search history.

(56) References Cited

U.S. PATENT DOCUMENTS

| 6,608,396 | B2 | 8/2003 | Downer et al. |
| 2008/0084184 | A1* | 4/2008 | Ohnuki .......................... 320/116 |
| 2008/0231231 | A1* | 9/2008 | Hartzog ......................... 320/118 |
| 2009/0284224 | A1* | 11/2009 | Miyazaki et al. ............. 320/118 |

FOREIGN PATENT DOCUMENTS

| DE | 10101542 A1 | 4/2002 |
| JP | 11032443 A | 2/1999 |
| JP | 2001-268815 | 9/2001 |
| JP | 2004-343584 | 12/2004 |
| JP | 2005-098588 | 4/2005 |
| JP | 2006-67778 | 9/2006 |
| WO | 2008115538 A1 | 9/2008 |
| WO | WO2008/115538 A1 * | 9/2008 |

* cited by examiner

*Primary Examiner* — Edward Tso
*Assistant Examiner* — Ahmed Omar
(74) *Attorney, Agent, or Firm* — Young Basile

(57) ABSTRACT

A secondary battery system that is light in weight and low in cost is provided, which comprises a plurality of secondary batteries connected in series. A plurality of first diodes each has an anode connected to a negative electrode of the corresponding secondary battery. A plurality of second diodes each has a cathode connected to a positive electrode of the corresponding secondary battery. A plurality of capacitors is each connected to a junction portion between the cathode of the first diode and the anode of the second diode. An alternating current power source is commonly connected to the junction portions through the capacitors.

15 Claims, 19 Drawing Sheets

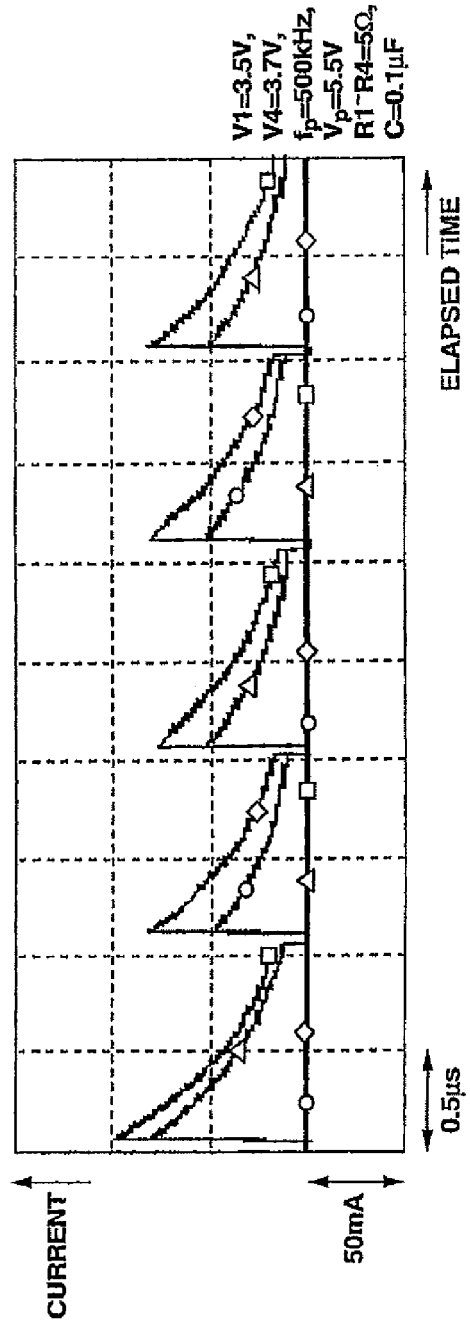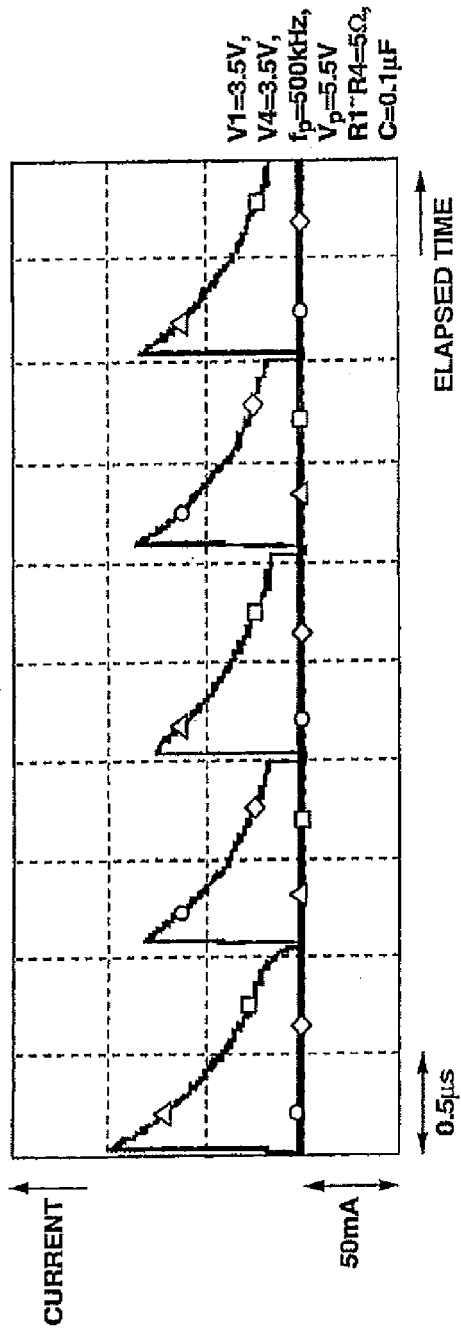

ical field

The invention relates generally to secondary battery systems, and more particularly to secondary battery systems that are able to adjust a voltage balance of a unit that includes secondary batteries connected in series.

SECONDARY BATTERY SYSTEM

CROSS-REFERENCE TO RELATED APPLICATIONS

This application claims priority from Japanese Patent Application Serial No. 2008-324082, filed Dec. 19, 2008, and No. 2009-206126, filed Sep. 7, 2009, each of which is incorporated herein in its entirety by reference.

TECHNICAL FIELD

The invention relates generally to secondary battery systems, and more particularly to secondary battery systems that are able to adjust a voltage balance of a unit that includes secondary batteries connected in series.

BACKGROUND

In recent years, the automobile industry has been developing electric vehicles (EV) and hybrid electric-internal combustion vehicles (HEV) to introduce into the market for dealing with air pollution and global warming in response to requests to reduce emissions of carbon dioxide. They are also making efforts in developing secondary batteries sufficient for driving an electric motor, which is key to making such vehicles actually practicable. In the secondary batteries used in such vehicles, it is common to arrange a plurality of secondary batteries in series.

However, if the secondary batteries connected in series have variations in voltage, a secondary battery whose voltage is smaller than others fails to fully charge, which causes deterioration of the performance of the entire unit. For this reason, it is important to charge the batteries as evenly as possible.

An idea that makes the charging of secondary batteries connected in series even is disclosed in Japanese Laid-open Patent Application (Tokkai) 2001-268815. Therein, by using electric current produced with the aid of a power transformer, each secondary battery is intermittently charged through a switch, and in accordance with a detected charging condition of each secondary battery, the rate of switching is varied thereby to achieve an even charging of all the secondary batteries.

BRIEF SUMMARY

However, due to usage of the power transformer Japanese Laid-open Patent Application (Tokkai) 2001-268815, the secondary battery system produced fails to achieve satisfactory weight and cost.

In order to solve the above-mentioned problem, a secondary battery system comprising a plurality of secondary batteries connected in series; a plurality of first diodes each having an anode and a cathode, with the anode connected to a negative electrode of the corresponding secondary battery; a plurality of second diodes each having an anode and a cathode, with the cathode connected to a positive electrode of the corresponding secondary battery and the anode connected to the cathode of the corresponding first diode; a plurality of capacitors each being connected to a junction portion between the cathodes of the first diodes and the anodes of the corresponding second diodes; and an alternating current power source commonly connected to the junction portions through the capacitors, the alternating current power source selectively operable to produce an alternating current voltage.

In a secondary battery system of the present invention, adjustment in voltage balance of the secondary batteries is achieved with a simple circuit without usage of a power transformer, so that satisfactory weight and cost of the secondary battery system is achieved.

BRIEF DESCRIPTION OF THE DRAWINGS

The description herein makes reference to the accompanying drawings wherein like reference numerals refer to like parts throughout the several views, and wherein:

FIG. 7A is a graph showing the results of simulation on a voltage dependency of secondary batteries having varying voltage relative to charging current of the circuit shown in FIG. 6;

FIG. 7B is a graph showing the results of simulation on a voltage dependency of secondary batteries having equal voltage relative to charging current of the circuit shown in FIG. 6;

DETAILED DESCRIPTION OF EMBODIMENTS OF THE INVENTION

Figure 1:
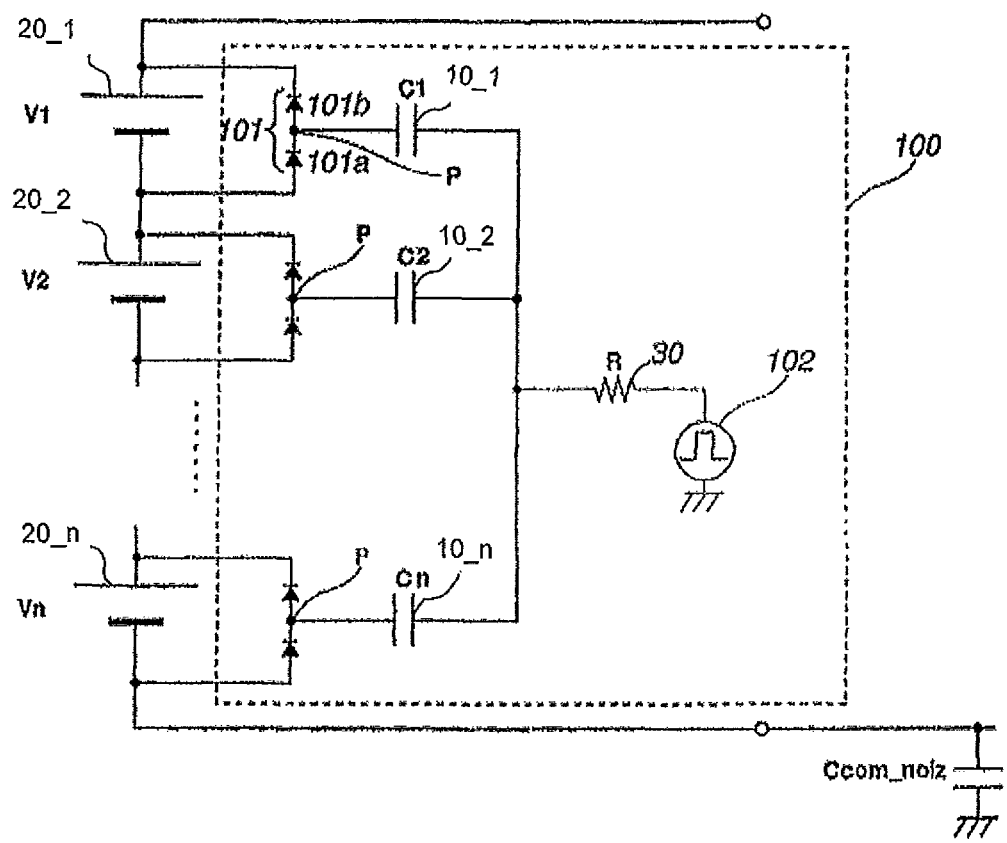
FIG. 1 is schematic view of a circuit showing a construction of a secondary battery system of a first embodiment of the invention.

In the following, embodiments comprising a secondary battery system of the invention are described in detail with reference to the accompanying drawings.

The secondary battery system of a first embodiment comprises secondary batteries $20\_1$ to $20\_n$ having voltages V1 to Vn, diodes 101, capacitors $10\_1$ to $10\_n$ having capacitance values C1 to Cn, capacitor Ccom_noiz, a resistor 30 having a resistance value R and an AC power source 102. Since capacitor Ccom_noiz represents a capacitor typically used for canceling common mode noise produced in an inverter, its detailed explanation is omitted. Current from an upper terminal of AC power supply 102 finally flows into a lower terminal of AC power supply 102 through capacitor Ccom_noiz. When wiring of the circuit is long, capacitor Ccom_noiz may be installed in the battery system 100 to reduce noise.

Figure 2:
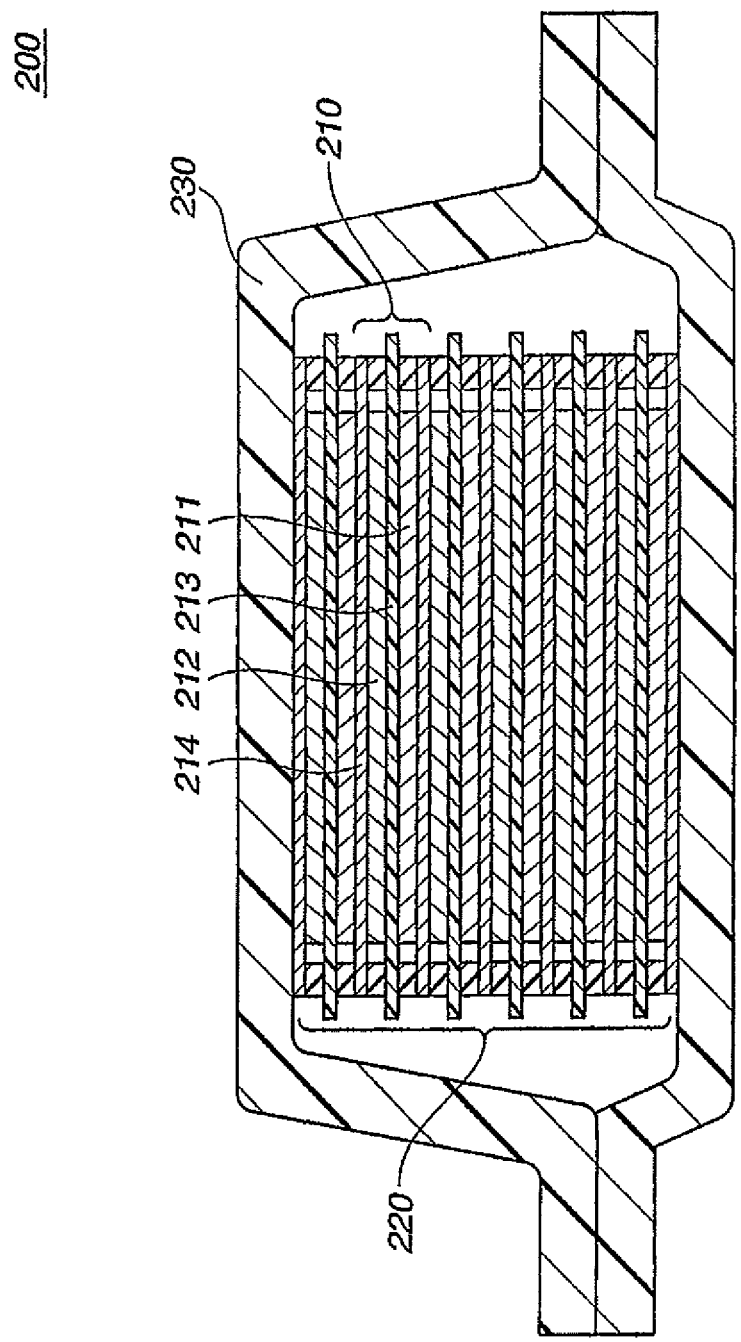
FIG. 2 is a cross-sectional view showing a construction of a bipolar type lithium-ion secondary battery.

Each of secondary batteries $20\_1$ to $20\_n$ is, for example, a cell of bipolar type secondary battery such as the one as shown in FIG. 2, which constitutes a minimum unit of the batteries. However, in the invention, the secondary batteries are not limited to the disclosed batteries. That is, any type of secondary batteries including a plurality of cells connected in series is usable. In other words, every type of secondary batteries is usable.

As is shown in FIG. 2, a bipolar type lithium-ion secondary battery 200 comprises a plurality of cells (secondary batteries) 210 that are stacked on one another. More specifically, the bipolar type lithium-ion secondary battery 200 has a plurality of electrodes, each including a collector 214 that has one surface formed with a positive active material layer 212 and the other surface formed with a negative active material layer 211. The electrodes are so arranged that the positive active material layer 212 formed on one electrode faces the negative active material layer 211 formed on the other electrode. An ionic conduction layer 213 is disposed between the positive active material layer 212 and the negative active material layer 211, so that the electrodes and ionic conduction layers 213 are alternately stacked on one another. A generator unit 220 including the stacked cells 210 is hermetically sealed with a laminate film 230.

Diode 101 is an electron element with a rectifying function. Diode 101 has an anode (input terminal) and a cathode (output terminal) and is characterized such that when applied with a forward bias smaller than a predetermined threshold value, conduction through diode 101 is not achieved, and when applied with a forward bias larger than the predetermined threshold value (that is, when the anode is made higher in potential than the cathode), conduction through diode 101 is achieved (that is, current flows from the anode to the cathode). Furthermore, when conduction is achieved, diode 101 exhibits a low impedance and its output voltage is fixed to the threshold voltage. A silicone diode is usable as diode 101. As shown, each diode 101 comprises diodes 101a, 101b.

Each capacitor $10\_1$ to $10\_n$ is a passive element that accumulates and releases an electrical charge by capacitance. When operating in a high frequency, a capacitor exhibits a low impedance, and when operating in a low frequency, a capacitor exhibits a large impedance. Thus, capacitors $10\_1$ to $10\_n$ can be used as elements for cutting direct current (i.e., DC). A ceramic capacitor, aluminum electrolytic capacitor and/or plastic film capacitor is preferably used for each capacitor $10\_1$ to $10\_n$. That is, if a capacitor of a type that induces a short-circuit upon fault thereof is used, the secondary battery system of the first embodiment shown in FIG. 1 tends to show that, due to the short-circuit during fault of the at least one of capacitors $10\_1$ to $10\_n$, the corresponding one of DC high voltages V1 to Vn of the secondary batteries $20\_1$ to $20\_n$ is applied to AC power source 102, thereby causing widespread fault of the system. Accordingly, it is preferable to use a capacitor of a type that induces an open circuit upon fault thereof. By using such capacitors, a reliable secondary battery system is provided.

Resistor 30 is a passive element that provides a circuit with a resistance to restrict current flowing in the circuit and to lower voltage applied to the circuit. A chip resistor constructed of a chrome metal thin layer is usable as resistor 30.

AC power source 102 is a device that is able to output at least pulses of voltage-amplitude that are provided by adding a voltage of the fully charged cell to threshold voltages of the two diodes 101a and 101b. For example, if the voltage V1 of the fully charged cell $10\_1$ is 4.2V and the threshold voltages of the two diodes 101a and 101b are 0.6V and 0.6V respectively, AC power source 102 should be a device that is able to output pulses of voltage-amplitude of 5.4V.

Diodes 101, capacitors $10\_1$ to $10\_n$, resistor 30 and AC power source 102 may be arranged outside laminate film 230. That is, for example, these elements may be mounted to a case (metal case) of a battery module in which a plurality of generator units 220, each being hermetically sealed with the laminate film 230, is installed.

Figure 3:
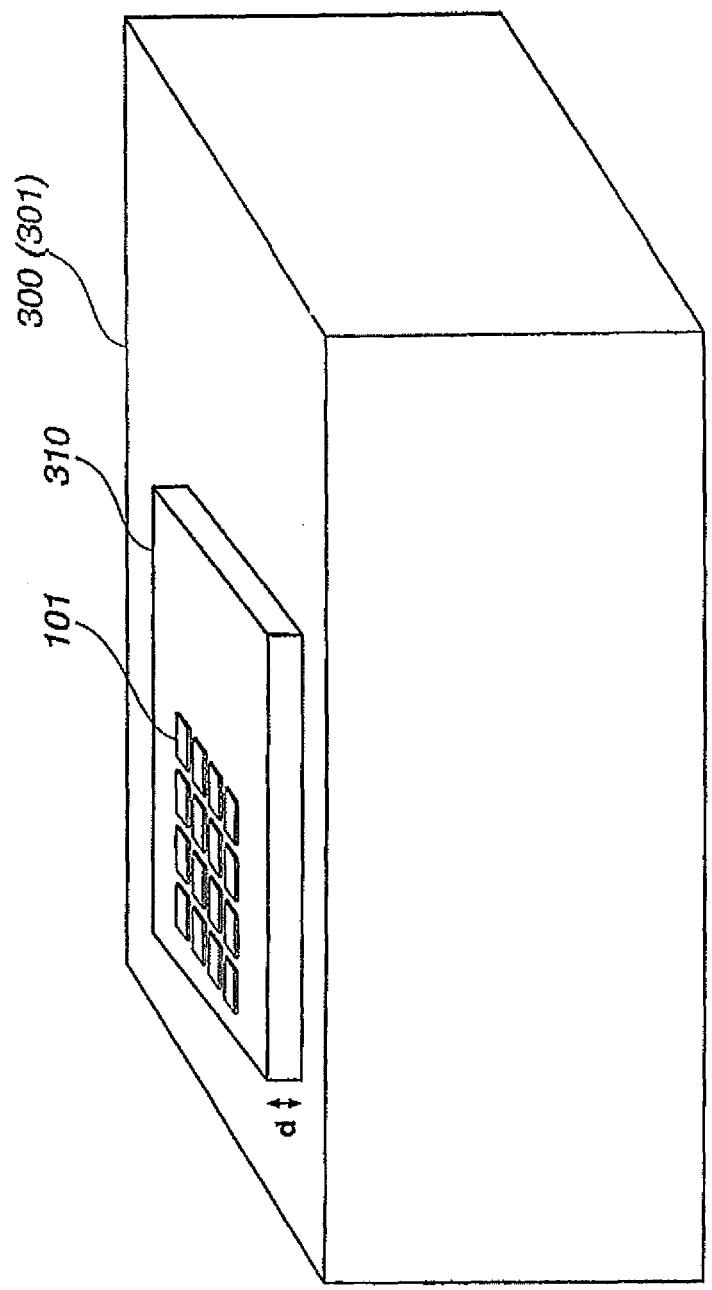
FIG. 3 is a perspective view of a battery module that includes a case onto which a diode-mounted substrate is mounted.

FIG. 3 is an illustration showing a battery module 300 that has a case 301 onto which a substrate 310 having diodes 101 put thereon is mounted. In FIG. 3, each diode 101 is separated from the case 301 of the battery module 300 by a distance corresponding to the thickness d of the substrate 310. It is preferable to determine the thickness d to be smaller than 10 mm, so that all diodes 101 are placed within a distance of less than 10 mm from the case 301 of the battery module 300. Since the threshold voltage of diode 101 (i.e., voltage drop caused by the diode) has a relatively high dependency to temperature, the threshold voltage affects the accuracy with which the voltage balance of the secondary battery is adjusted. That is, as will be described hereinafter, in the secondary battery system of the first embodiment, the voltages of the secondary batteries become balanced with a precision of dispersion of the threshold voltages of diodes 101. Accordingly, diodes 101 are arranged at a position near metal case 301 of battery module 300 where a thermal conductivity is large and a temperature distribution is small, so that the temperature distribution of diodes 101 is made small. By placing all of diodes 101 within a distance of about 10 mm from case 301, the accuracy of the voltage balance of the secondary batteries can be increased. It is preferable to arrange diodes 101 as close as possible to each other.

As is shown in FIG. 1, diodes 101, capacitors $10\_1$ to $10\_n$, resistor 30 and AC power source 102 constitute a circuit (which will be referred to as a charging circuit 100 in the following) that charges the secondary batteries to adjust the voltage balance of each secondary battery.

For charging each cell (i.e., each secondary battery) by charging circuit 100, electrode terminals (i.e., collectors 214) of each cell 210 are exposed to the outside of laminate film 230 and connected to charging circuit 100. For exposing the electrode terminals of each cell 210 to the outside of laminate film 230, there are various methods. For example, one of them is a method in which a comb-shaped flexible wiring substrate including a tooth portion and a stick portion is used. For producing the comb-shaped flexible wiring substrate, a construction is prepared that has both a structure in which each tooth extends from a terminal end of the stick portion to a leading end of each tooth and a wiring by which collector 214 of each cell 210 contacting the leading end of each tooth is led to the end of the stick portion exposed to the outside of laminate film 230. That is, inside of laminate film 230, the leading end of each tooth of the flexible wiring substrate is arranged to fixedly contact collector 214 of each cell 210, and with the end of the stick portion of the flexible wiring substrate exposed to the outside of the laminate film 230, generator unit 220 can remain hermetically sealed by laminate film 230. With this arrangement, the electrode terminals of each cell 210 can be exposed to the outside of laminate film 230 for connecting with charging circuit 100.

As is shown in FIG. 1, charging circuit 100 is connected to secondary batteries 20_1 to 20_$n$ respectively. That is, the anodes of first diodes 101$a$ are connected to respective negative electrodes of secondary batteries 20_1 to 20_$n$, the cathodes of second diodes 101$b$ are respectively connected to positive electrodes of secondary batteries 20_1 to 20_$n$, and junction portions of first and second diodes 101$a$, 101$b$ are connected to AC power source 102 through respective capacitors 10_1 to 10_$n$. Between the capacitors 10_1 to 10_$n$ and AC power source 102, resistor 30 is commonly disposed. Since resistor 30 is so arranged, electric current flows through resistor 30 for selectively charging and discharging capacitors 10_1 to 10_$n$. Due to provision of resistor 30, the electric current flowing through diodes 101 is controlled, and thus usage of small-sized diodes (i.e., diodes of which the admissible current value is small) is possible. Due to usage of such small-sized diodes, the secondary battery system can be made compact in size and low in cost.

Figure 4:
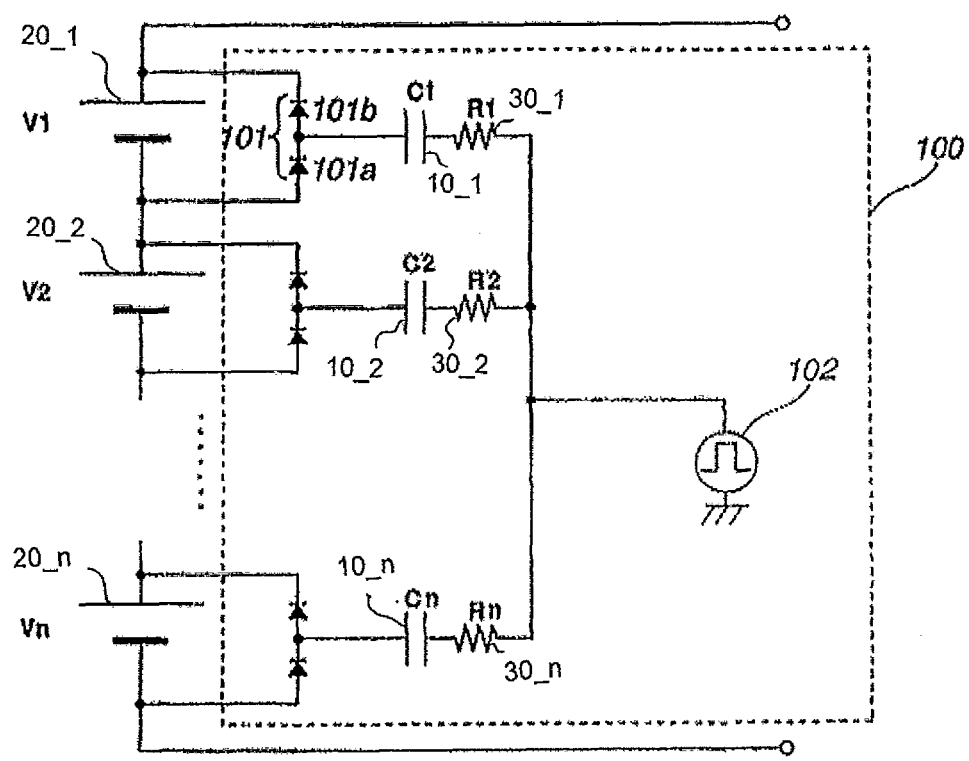
FIG. 4 is a schematic view of a circuit showing a first variation of the secondary battery system of the first embodiment of the invention.

Like charging circuit 100 shown in FIG. 1, resistor 30 may be commonly put between the mass of capacitors 10_1 to 10_$n$ and AC power source 102. However, if desired, as is shown in FIG. 4, each of resistors 30_1 to 30_$n$ having resistance values R1 to Rn may be put between each of capacitors 20_1 to 20_$n$ and AC power source 102. Because of provision of resistors 30_1 to 30_$n$ between AC power source 102 and the mass of the capacitors 10_1 to 10_$n$, electric current flows through resistors 30_1 to 30_$n$ for charging and discharging capacitors 10_1 to 10_$n$. In this arrangement, resistance value R1 to Rn of each resistor 30_1 to 30_$n$ is "n" times as much as resistance value R of resistor 30 used in charging circuit 100 of FIG. 1. That is, each resistance value R1 to Rn is provided by multiplying resistance value R of resistor 30 by "n" that is the number of the secondary batteries that are connected in series. With this, the time constant (i.e., the number provided by multiplying a capacitance value by a resistance value) for charging each of capacitors 10_1 to 10_$n$ of charging circuit 100 of FIG. 4 becomes equal to that the time constant of FIG. 1. Accordingly, charging circuit 100 of FIG. 4 has the same effect as that of FIG. 1. In charging circuit 100 of FIG. 1, only one resistor 30 is used, and thus, as compared with charging circuit 100 of FIG. 4, the charging circuit 100 of FIG. 1 has merit in that there is no need to take the relative dispersion of the resistance values R1 to Rn of resistors 30_1 to 30_$n$ into consideration.

Figure 5:
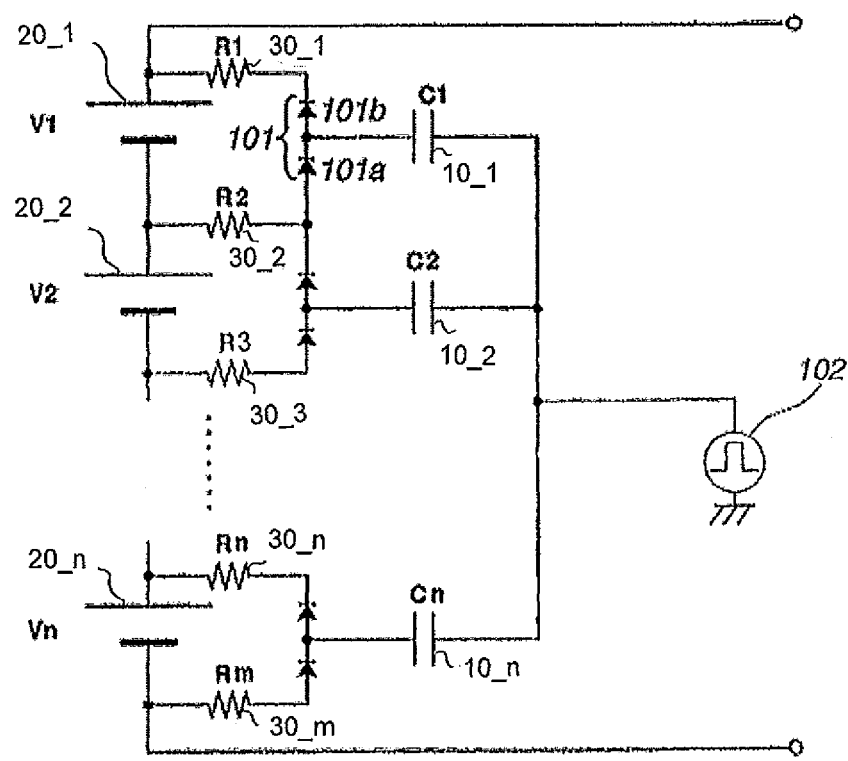
FIG. 5 is a schematic view of a circuit showing a second variation of the secondary battery system of the first embodiment of the invention.

As is shown in FIG. 5, if desired, a modification may be employed in which each resistor 40_1 to 40_$m$ having resistance values R1 to Rm (where m=n+1) is disposed between the anode of each first diode 101$a$ and the negative electrode of each of secondary batteries 20_1 to 20_$n$ or between the cathode of each second diode 101$b$ and the positive electrode of each of secondary batteries 20_1 to 20_$n$. Locating resistors 40_1 to 40_$m$ in this arrangement causes electric current to flow through resistors 40_1 to 40_$m$ for charging and discharging capacitors 10_1 to 10_$n$. Also in this arrangement, each resistance value R1 to Rm of each resistor 40_1 to 40_$m$ is "n" times as much as that the resistance value R of resistor 30 used in charging circuit 100 of FIG. 1. That is, each resistance value R1 to Rm is provided by multiplying resistance value R of resistor 30 by "n" that is the number of the secondary batteries that are connected in series. With this, the time constant for charging each of capacitors 20_1 to 20_$n$ becomes equal to that of FIG. 1. Accordingly, the charging circuit of FIG. 5 has the same effect as that of FIG. 1 or FIG. 4.

In the following, operation of the secondary battery system of the first embodiment of the invention shown in FIG. 1 is described. In an initial condition, that is, a condition taken before the time when a pulse of voltage is outputted from AC power source 102, diodes 101$a$ and 101$b$ are not conductive, and thus, a diode junction portion P between the cathode of first diode 101$a$ and the anode of second diode 101$b$ is in a high impedance condition. However, due to flow of leak current through diodes 101$a$ and 101$b$, the potential of diode junction portion P usually takes a value between the potential of the positive electrodes of secondary batteries 20_1 to 20_$n$ and the potential of the negative electrodes of the same.

The output voltage from AC power source 102 changes from Hi to Lo in a short time. Since each capacitor 10_1 to 10_$n$ becomes conductive when operating at a high frequency, the potential at diode junction portion P is quickly lowered. With this, first diode 101$a$ is applied with a forward voltage and when the voltage reaches its threshold voltage, first diode 101$a$ becomes conductive. Since a voltage drop of first diode 101$a$ that has become conductive is fixed to the threshold voltage, the potential of diode junction portion P is clamped (i.e., the potential is kept at a given value). Each capacitor 10_1 to 10_$n$ is charged with electric current that flows from the negative electrode of a respective secondary battery 20_1 to 20_$n$ through first diode 101$a$ and resistor 30.

The output voltage from AC power source 102 changes from Lo to Hi in a short time. Since each capacitor 10_1 to 10_$n$ becomes conductive when operating at a high frequency, the potential at diode junction portion P is quickly increased. With this, second diode 101$b$ is applied with a forward voltage and when the voltage reaches its threshold voltage, second diode 101$b$ becomes conductive. Since a voltage drop of second diode 101$b$ that has become conductive is fixed to the threshold voltage, the potential of the positive electrode of each secondary battery is clamped to a potential that is provided by lowering the "Hi" potential of diode junction portion P by a voltage corresponding to the threshold voltage. Each capacitor 10_1 to 10_$n$ is discharged with electric current that flows through a respective second diode 101$b$ and resistor 30, and each secondary battery 20_1 to 20_$n$ is charged with electric current that flows from a respective capacitor 10_1 to 10_$n$ to the positive electrode through second diode 101$b$.

When, under this condition, the output amplitude of AC power source 102 is set to a value that is provided by adding the threshold voltages of first and second diodes 101a and 101b to the voltage of the fully charged secondary batteries (referred to as the "charging complete voltage" hereinafter), each secondary battery is applied with the charging complete voltage. When, for example, the charging complete voltage is 4.2V and the threshold voltages of diodes 101a and 101b are each 0.6V, the output amplitude of AC power source 102 is set to 5.4V. With this, identical magnitudes of the charging complete voltage can be applied to each secondary battery even if a battery has a lower voltage due to a low charging rate or has a higher voltage due to a high charging rate. From each capacitor 10_1 to 10_n to the corresponding secondary battery 20_1 to 20_n, electric current of a magnitude proportional to a difference between the voltage of that secondary battery and the charging complete voltage flows, so that each secondary battery 20_1 to 20_n is charged. Accordingly, a secondary battery that is low in charging rate is charged with a high charging current and a secondary battery that is high in charging rate is charged with a low charging current, so that voltages V1 to Vn of secondary batteries 20_1 to 20_n become balanced with a precision of dispersion of the threshold voltages of diodes 101. Accordingly, the secondary battery system of the first embodiment balances voltages of secondary batteries with a high precision.

In this embodiment, capacitors 10_1 to 10_n function to charge secondary batteries 20_1 to 20_n and cut or filter direct current (DC). That is, due to the DC cutting function of capacitors 10-1 to 10_n, those of secondary batteries 20_1 to 20_n having different voltages can be commonly applied with only the alternating current component of voltage pulses using only one AC power source 102.

Thus, in the secondary battery system of this embodiment, by adjusting the voltage balance of the secondary batteries, weight and cost reduction of the secondary battery system can be realized.

Figure 6:
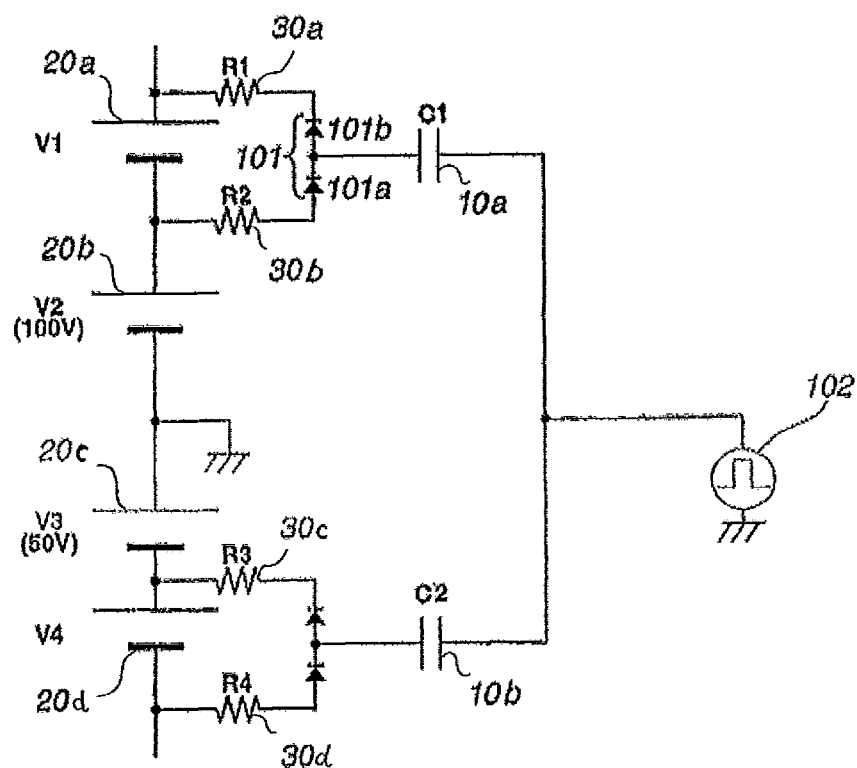
FIG. 6 is a schematic view of a circuit of a secondary battery system for purposes of simulating the first embodiment of the invention.

In the following, the results of a simulation applied to the secondary battery system of the first embodiment are described. FIG. 6 is a schematic showing a circuit of the secondary battery system for purposes of simulation. The simulation circuit is a slight modification to the secondary battery system shown in FIG. 5.

As is shown in FIG. 6, in the simulation, a secondary battery 20a has a lower voltage V1 due to low charging rate and a secondary battery 20d has a voltage V4 and a charging rate higher than that of secondary battery 20a. Secondary batteries 20b and 20c have fixed voltages 100V and 50V, respectively. Secondary batteries 20b and 20c are fully charged secondary batteries and they are connected in series. Fixing the voltage of secondary batteries 20b and 20c means that further charging is not possible in batteries 20b, 20c. That is, it is considered that the voltage amplitude applied by AC power source 102 and the voltage of the secondary batteries 20b and 20c are balanced. The voltage amplitude of AC power source 102 was 5.5V, and the frequency of the pulse was 500 kHz. The resistance values R1 to R4 of resistors 30a to 30d were all 5Ω. The capacitance values C1 and C2 of capacitors 10a and 10b were both 0.1 μF.

FIG. 7A is a graph showing the results of a simulation of the simulation circuit in FIG. 6 in a case wherein voltage V1 of secondary battery 20a was 3.5V and voltage V4 of secondary battery 20d was 3.7 V. Since a voltage of secondary battery whose charging rate at 100% is about 4.2V, secondary batteries 20a, 20d have lower charging rates than that of a secondary battery whose charging rate is at 100%. The waves indicated by diamonds and squares show electric current that flows through resistors 30a and 30b of FIG. 6 respectively. The waves indicated by circles and triangles show electric current that flows through resistors 30c and 30d of FIG. 6 respectively. As is seen from the graph of FIG. 7A, the charging current that flows through resistors 30a and 30b to secondary battery 20a, which has lower voltage V1, is a higher value than the charging current that flows through resistors 30c and 30d to secondary battery 20d, which has higher voltage V4. This means that secondary batteries 20a and 20d are charged in such a way that the respective voltages V1, V4 become balanced.

FIG. 7B is a graph showing the results of a simulation of the simulation circuit in FIG. 6 in a case wherein voltage V1 of secondary battery 20a and voltage V4 of secondary battery 20d were the same at 3.5 V. Unlike the case of FIG. 7A, in the case of FIG. 7B, the charging current that flows through resistors 30a and 30b to secondary battery 20a shows the same value as the charging current that flows through resistors 30c and 30d to secondary battery 20d. That is, in this case, secondary batteries 20a and 20d are charged keeping the balanced value of the respective voltages V1 and V4.

Figure 8A:
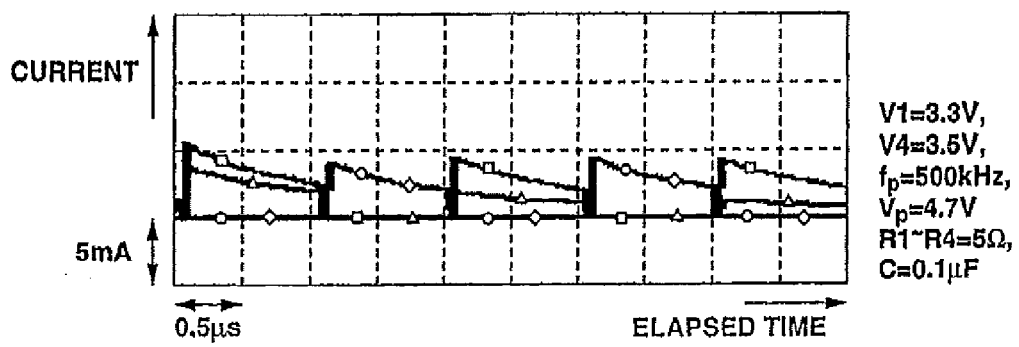
FIGS. 8A-8C are graphs showing the results of simulation of a pulse frequency dependency of secondary batteries having varying voltage relative to charging current of the circuit shown in FIG. 6.
Figure 8B:
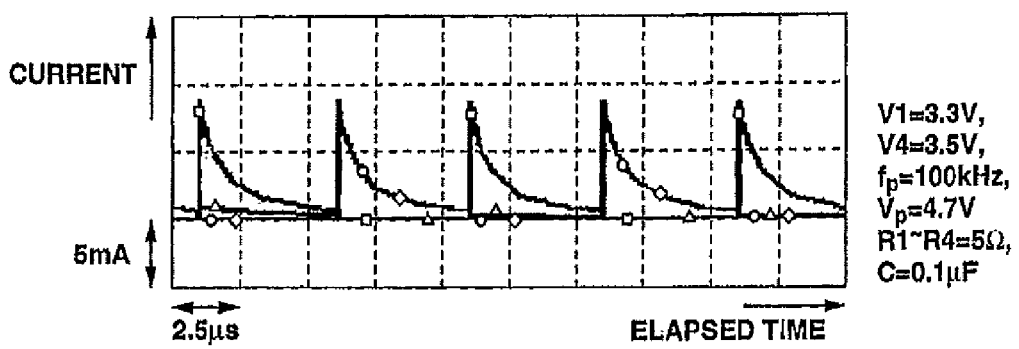
Figure 8C:
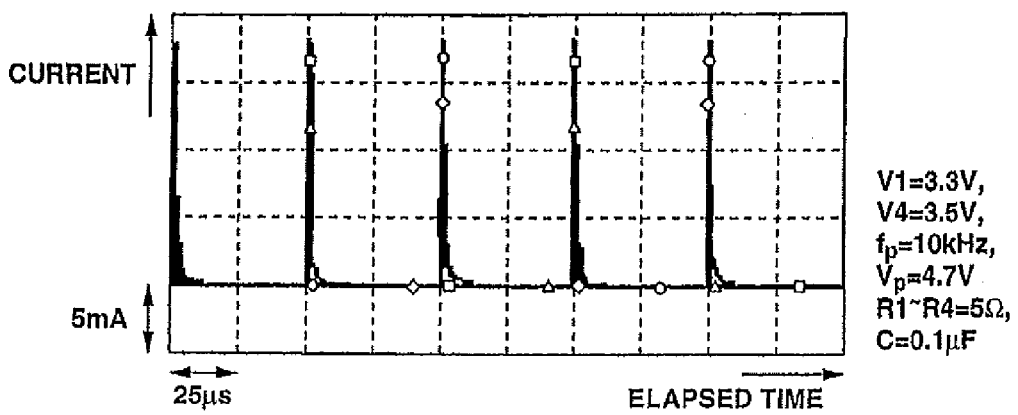

FIG. 8A is a graph showing the results of a simulation of the simulation circuit in FIG. 6 in a case wherein voltage V1 of secondary battery 20a was 3.3V, voltage V4 of secondary battery 20d was 3.5V, and the pulse frequency of AC power source 102 was 500 kHz. FIG. 8B is a graph showing the results of a simulation of the circuit in FIG. 6 in a case wherein the conditions were the same as in the case of FIG. 8A except that the pulse frequency of AC power source 102 was 100 kHz. FIG. 8C is a graph showing the results of a simulation of the circuit in FIG. 6 in a case wherein the conditions were the same as in the case of FIG. 8A except that the pulse frequency of AC power source 102 was 10 kHz.

When the graphs of FIGS. 8A, 8B and 8C are compared with one another, it becomes apparent that the mean of the electric current that flows through resistors 30a and 30b (or resistors 30c and 30d) was the lowest in the case of FIG. 8C. A larger mean was in the case of FIG. 8B, and the largest mean was in the case of FIG. 8A. The pulse frequency of 10 kHz used in the simulation of FIG. 8C corresponds to a cycle of 100 μs. This cycle (i.e., 100 μs) is more than 100 times greater than a frequency that corresponds to the time constant of resistors 30a to 30d and capacitors 10a, 10b. If the AC current from AC power source 102 has a too large a cycle with respect to the time constant, the period for which the charging current has a lower level is increased as compared with a period for which the charging current has a peak level, and thus balancing voltages V1, V4 of secondary batteries 20a, 20d needs a longer time. That is, if an AC power source supplies alternating current whose cycle is too large relative to the time constant, the mean of the charging current is lowered, and thus charging secondary batteries becomes ineffective.

Accordingly, it is desirable to set the cycle of the alternating current voltage from AC power source 102 to a level smaller than 100 times a time constant that is obtained by multiplying resistance value R1 to R4 of resistors 30a to 30d by capacitance value C1, C2 of capacitors 10a, 10b. With this limit, secondary batteries can be charged in a much shorter time and voltage balancing of secondary batteries is smoothly achieved.

Figure 9:
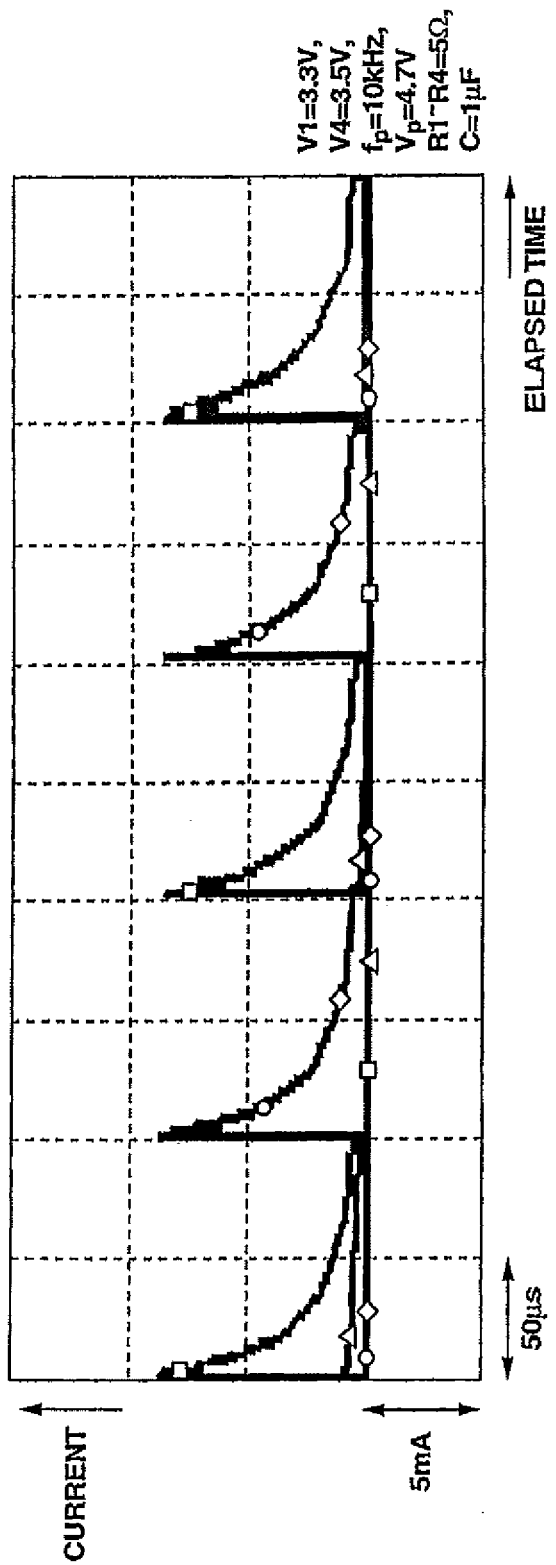
FIG. 9 is a graph showing the results of simulation of the circuit shown in FIG. 6 using 1 µF capacitors.

FIG. 9 is a graph showing the results of a simulation carried out in the simulation circuit of FIG. 6 with capacitance value C1, C2 of each capacitor 10a and 10b being 1 μF. That is, in the case of FIG. 9, the conditions are identical to those of FIG. 8C except that capacitance value C1, C2 of each capacitor 10a and 10b changes to 1 μF from 0.1 μF. When comparing the graphs FIGS. 8C and 9, it is apparent that the mean of the charging current for secondary batteries V1, V4 is increased by increasing capacitance value C1, C2 of each capacitor 10a and 10b from 0.1 µF to 1 µF.

The graph of FIG. 9 shows results that were obtained under conditions that were identical to those in FIG. 8B except that capacitance value C1, C2 of each capacitor 10a and 10b is changed from 0.1 µF to 1 µF and the pulse frequency changed from 100 kHz to 10 kHz. When comparing the graphs of FIGS. 9 and 8B, it is apparent that the mean of the charging current for secondary batteries 20a and 20d is substantially the same. This means that if capacitance value C1, C2 of each capacitor 10a and 10b is increased from 0.1 µF to 1 µF, a 1/10 reduction of the pulse frequency from 100 kHz to 10 kHz brings about substantially the same mean of the charging current.

In the following, a case in which the secondary battery system of an embodiment of the invention is applied to a motor vehicle is described with respect to the flowchart of FIG. 10. In the following, the flowchart is described with the aid of operation steps. It is to be noted that the operation steps from S1000 to S1008 can be automatically carried out by using a program stored in memory of a control device. Such a control device, or controller, can be, for example, a microcomputer including a random access memory (RAM), a read-only memory (ROM) and a central processing unit (CPU) in addition to various input and output connections to receive monitored and/or measured values and to output commands related thereto as dictated by software. The operation steps are performed by execution by the CPU of the program, which is generally a software program stored in ROM. Although the program is described as being embodied in software, it could be implemented in whole or in part by hardware components. In addition, instead of a stand-alone control device, the program could be incorporated into a standard engine control unit when implemented in a motor vehicle.

In step S1000, the voltages of all the secondary batteries are measured. The voltages measured are stored in a memory device of the control device or in a memory device otherwise accessible by the program. The operation step S1000 and a subsequent operation step S1001 are carried out before engine starting (that is, prior to effecting Key ON). Since the voltage of each secondary battery slowly recovers or lowers, after stopping the motor vehicle, diagnosis of the voltage before engine starting is carried out.

In step S1001, if the difference between the highest detected voltage of the secondary batteries and the lowest detected voltage of the secondary batteries is larger than a threshold value, a voltage adjusting flag is set. The threshold value is determined based on a measuring accuracy for the voltage of the secondary batteries. That is, since the voltage measuring accuracy for the secondary batteries is about 1% for 5V, the threshold value is set to 50 mV. Thus, if a voltage difference larger than 50 mV is detected, it is desirable to set the voltage adjusting flag judging that the voltage imbalance of the secondary batteries is substantial. When the voltage imbalance of the secondary batteries is sufficiently small, the secondary battery system is not operated and thus voltage adjustment for the secondary batteries is effectively achieved.

When the voltage adjusting flag is set, the voltage of each secondary battery is measured again after stopping the engine of the vehicle at step S1005, and at step S1006, the AC power source is turned ON to apply the voltage pulse to each secondary battery.

In step S1002, upon turning the ignition key to ON, the vehicle becomes operational. As will be described hereinafter, during operation of an inverter, that is, under operation of the vehicle, measurement of voltage and charging of the secondary batteries is not carried out.

In step S1003, a judgment is carried out as to whether the ignition key is turned to OFF. When, after detecting that operation of the inverter has stopped due to the Key OFF condition, the program goes to step S1004.

Figure 11:
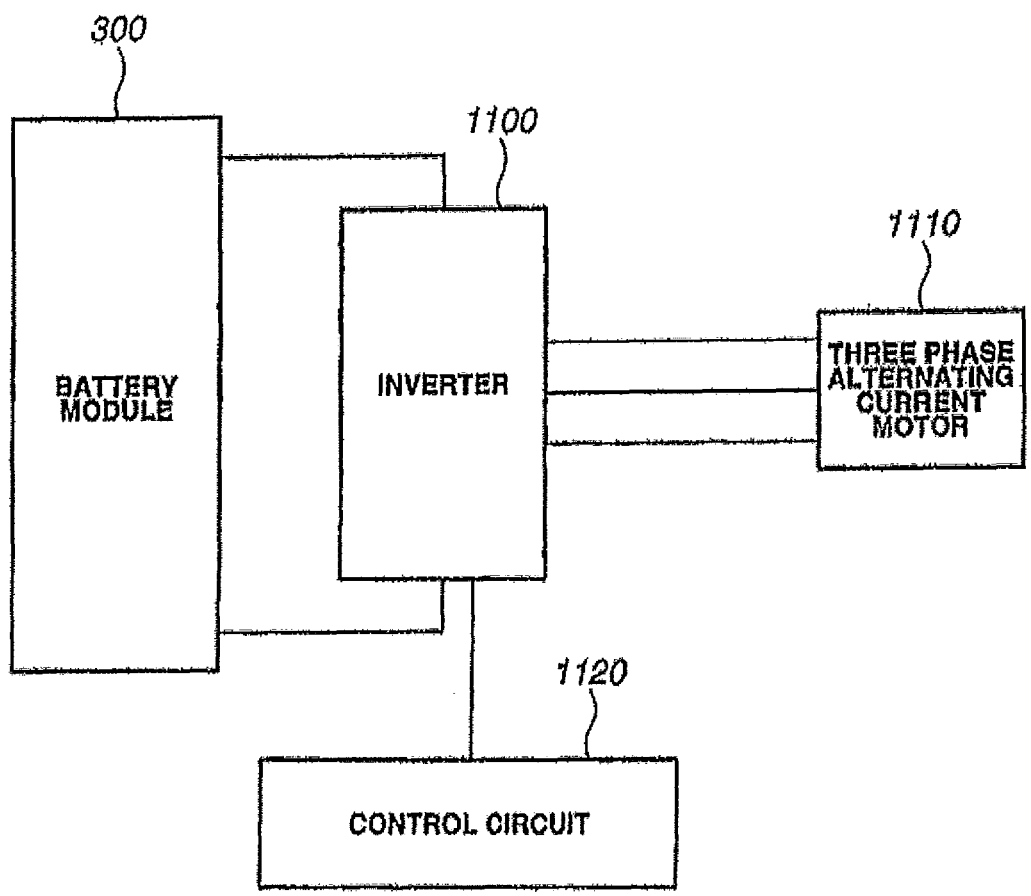
FIG. 11 is a schematic view showing a relation between a battery module and an inverter.

FIG. 11 is an illustration showing a relation between battery module 300 and an inverter (e.g., three-phase inverter) 1100. As is described hereinabove, in battery module 300 there are installed a plurality of generator units each being hermetically sealed with a laminate film. Battery module 300 functions to feed inverter 1100 with a DC voltage. Inverter 1100 comprises an upper arm including a U-phase upper switch, a V-phase upper switch and W-phase upper switch, and a lower arm including a U-phase lower switch, a V-phase lower switch and a W-phase lower switch. By control signals issued from a control circuit 1120, the six switches of the upper and lower arms are controlled in ON/OFF manner to carry out a conversion between direct current and alternating current (AC). A junction portion between the U-phase upper switch and the U-phase lower switch, a junction portion between the V-phase upper switch and the V-phase lower switch and a junction portion between the W-phase upper switch and the W-phase lower switch respectively constitute a U-phase output terminal, a V-phase output terminal and a W-phase output terminal through which power is fed to a three-phase AC motor to drive the same. Such an inverter structure is common in the art, so it is not illustrated in detail in FIG. 11. Moreover, other inverter designs are possible.

Figure 10:
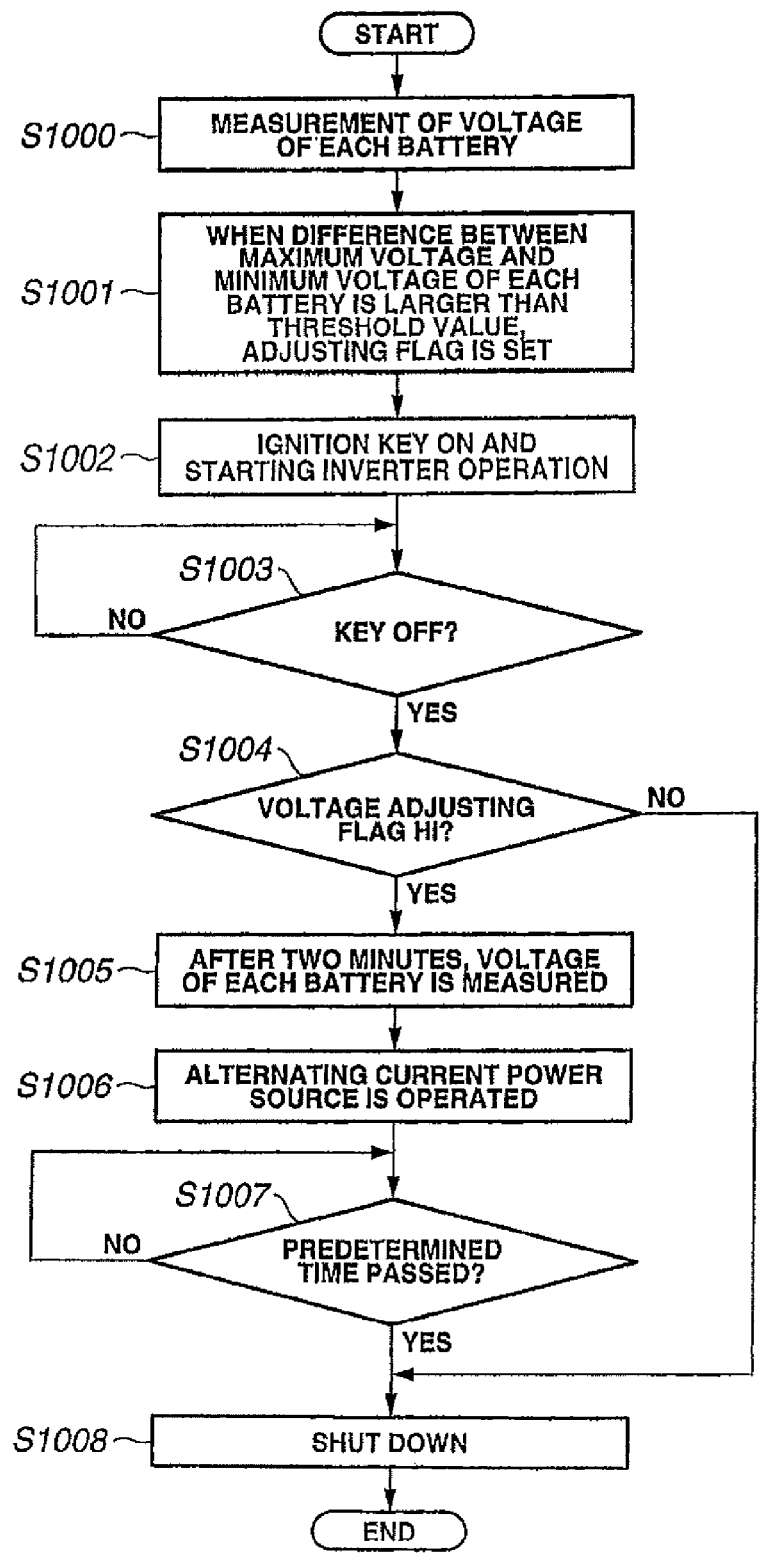
FIG. 10 is a flowchart showing operation steps executed by a control unit of the secondary battery system of the first embodiment of the invention when employed in a motor vehicle.

Control circuit 1120 can be the control device operating the program as described with respect to FIG. 10. Alternatively, control circuit 1120 could be a separate control device.

Before stopping the inverter 1100 with the stopping of the operation of the vehicle, the voltages of the secondary batteries that constitute the battery module 300 widely vary due to the charging/discharging influence of large current by inverter 1100. For example, if, during a discharging time for which the voltage is kept lowered, the secondary batteries are charged by the secondary battery system of an embodiment of the invention, the voltage balancing effect tends to be insufficient. Accordingly, by stopping operation of inverter 1100 and by effecting the battery charging during the time for which the voltage of the secondary batteries is kept settled, voltage balancing can be effectively carried out.

In step S1004, a judgment is carried out as to whether the voltage adjusting flag is Hi or not. If the voltage adjusting flag is not Hi, the program goes to step S1008 to shut down the secondary battery system. In contrast, if the voltage adjusting flat is Hi, the program goes to step S1005.

In step S1005, the system waits 2 minutes, and then the voltage of the secondary batteries is measured. The reason for waiting for 2 minutes is that 2 minutes is approximately the amount of time required to permit the secondary batteries to reach a sufficiently stable condition. Accordingly, the waiting time can be suitably varied in accordance with the characteristics of the secondary batteries, that is, the waiting time can be determined by carrying out an experiment for finding the time needed by the secondary batteries to reach a sufficiently stable condition. The measured voltage of each secondary battery is stored in a memory device of the control device or in a memory device otherwise accessible by the program.

In step S1006, the AC power source is turned ON. In order to set the voltages of each of the secondary batteries to the maximum one of the voltages measured, the AC power source is forced to output pulses of a voltage-amplitude that is provided by adding 1.2 V to the maximum voltage of the batteries. These output pulses feed the secondary batteries. It is to be noted that the value of 1.2V is determined by taking a voltage drop caused by the threshold voltage of diodes 101 shown in FIGS. 1, 4 and 5 into consideration. The cycle of the voltage pulses from the AC power source is a value that is smaller than 100 times a time constant that is obtained by multiplying a resistance value R (or R1 to Rn or Rm) of resistor 30 (or 30_1 to 30__n) by capacitance value C1 to Cn of capacitors 10_1 to 10__n.

In step S1007, a judgment is carried out as to whether a predetermined time has passed or not. Preferably, the predetermined time is determined in the following way. First, a reference table is stored in the memory device, the table showing an optimum relation between a difference between the maximum voltage of the secondary batteries and the minimum voltage of the same and an operation time of the AC power source. Then, an actually measured difference between the maximum voltage of the secondary batteries and the minimum voltage of the same is applied to the reference table to look up an optimum predetermined time. It is preferable to determine the time each time it is needed because if the disparity of the voltages of the secondary batteries is large, the secondary batteries with a lower voltage need a longer time to reach a higher voltage than the other batteries. Thus, it is preferable to vary the operation time of the AC power source in accordance with the difference between the maximum voltage of the secondary batteries and the minimum voltage of the same. When the charging time is too long, charging is inefficient. When the charging time is too short, the voltage disparity is not sufficiently corrected.

In step S1008, the secondary battery system is shut down. FIG. 10 is an example in which the secondary battery system of a first embodiment of the invention is applied to a motor vehicle. However, the secondary battery system described herein can also be applied to a motor vehicle in a different way.

Figure 12:
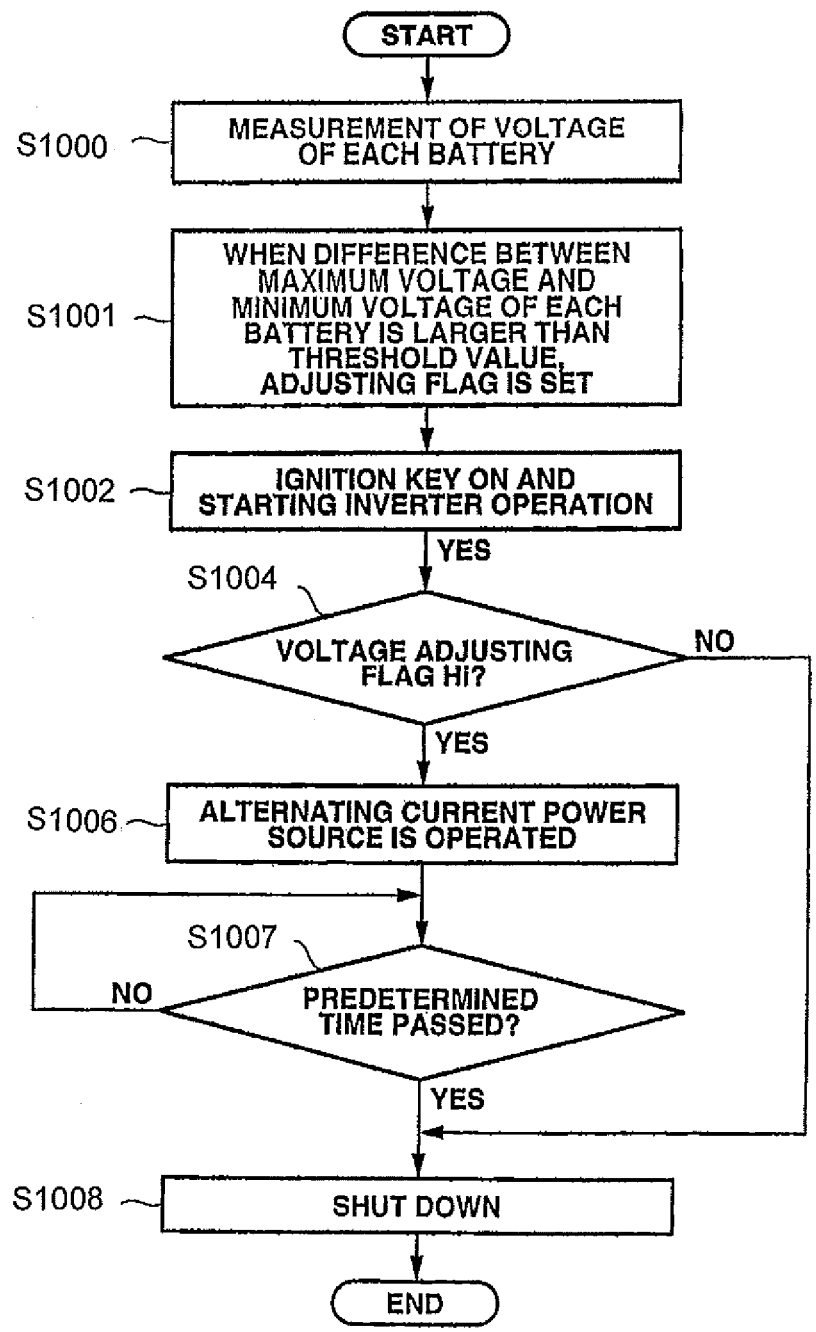
FIG. 12 is a flowchart showing operation steps executed by a control unit of a modification of the secondary battery system of the first embodiment of the invention when employed in a motor vehicle.

FIG. 12 is a flowchart used in a second embodiment wherein the secondary battery system described herein is applied to a motor vehicle. The flowchart of FIG. 12 differs from the flowchart of FIG. 10 in that the flowchart of FIG. 12 has no operation steps that correspond to steps S1003 and S1005 of the flowchart of FIG. 10. That is, in the flowchart of FIG. 10, after turning the key to OFF (step S1003 of FIG. 10), the AC power source is operated in step S1006. In the flowchart of FIG. 12, the operation of the AC power source is operated (step S1006 of FIG. 12) without turning the key to OFF (i.e., while driving the inverter). With such a process, there is no need to wait for the time that is needed in the flowchart of FIG. 10 (step S1005 of FIG. 10) for the voltages of the secondary batteries to reach the stable condition. Accordingly, the charging time for the secondary batteries can be shortened. Explanation of steps in the flowchart of FIG. 12 that correspond with those in FIG. 10 is omitted.

A secondary battery system 300 described herein can be mounted below a seat that is located at a center of a body of an electric vehicle. When the system is mounted in such a position, the vehicle cabin and the trunk room can have a larger free space. However, the position where the secondary battery system 300 is not limited to such a position. That is, the secondary battery system of embodiments of the invention disclosed herein may be mounted to a lower position in the trunk room or in an engine room provided at a front part of the vehicle. By using an embodiment of invention in a hybrid electric-internal combustion vehicle and/or an electric vehicle, the vehicle can last a long time and be a highly reliable vehicle.

In the foregoing, the secondary battery system of the first embodiment of the invention and the motor vehicles in which the system is mounted have been described.

The advantages of the secondary battery system of the first embodiment are now described. By adjusting a voltage balancing of secondary batteries arranged in a series circuit, significant weight reduction and cost reduction of the secondary battery system are realized. Additionally, the voltages of the secondary batteries can be balanced with a high accuracy.

In the following, a second embodiment of a secondary battery system of the invention is described in detail with reference to FIGS. 13 to 16. Detailed discussion of elements that correspond with those of the first embodiment is omitted.

The difference between the second embodiment and the first embodiment is that in the first embodiment AC power source 102 is supplied from outside of the secondary battery system, while in the second embodiment an AC power source 102A is supplied by the secondary batteries of the secondary battery system. Furthermore, in the second embodiment, unlike the case of the first embodiment, a voltage value V1 to Vn of each of secondary batteries 20_1 to 20__n is measured, and based on the results of the measurement, each of secondary batteries 20_1 to 20__n is charged.

Figure 13:
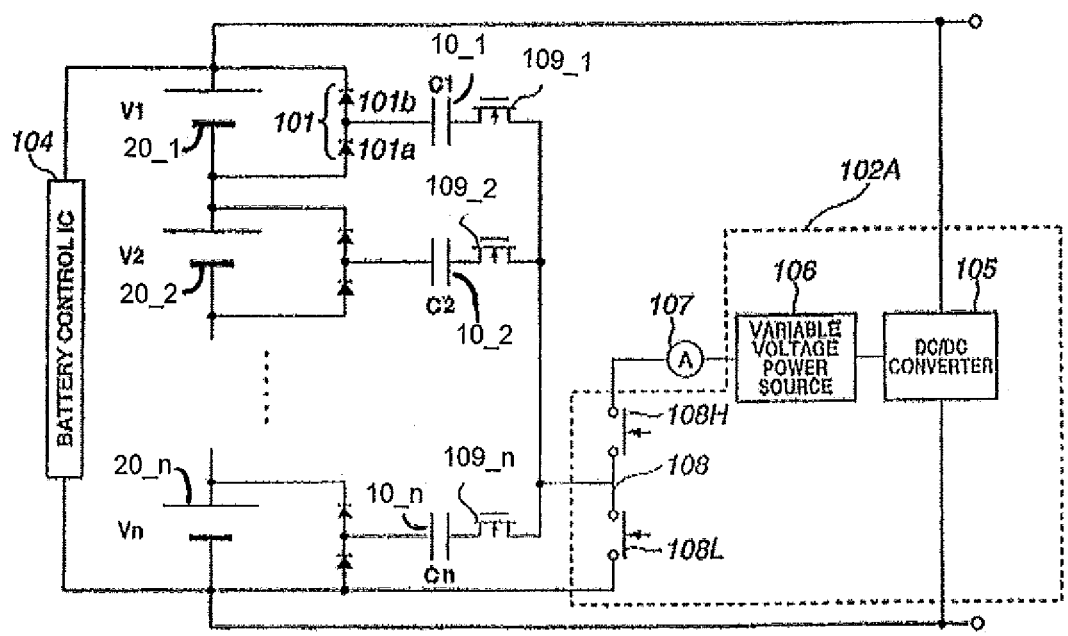
FIG. 13 is schematic view of a circuit showing the construction of the secondary battery system according to a second embodiment of the invention.
Figure 14:
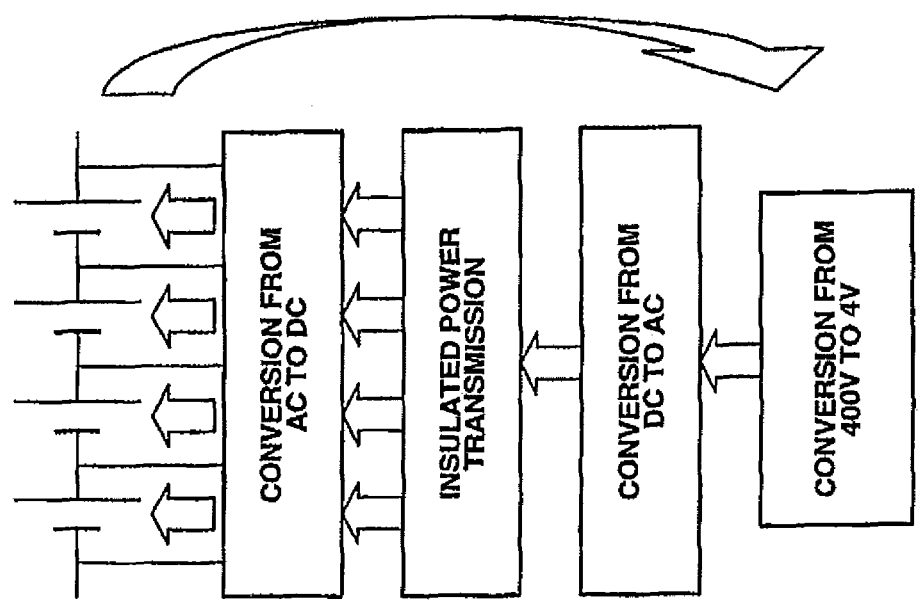
FIG. 14 is a flowchart showing a flow of energy in the secondary battery system of the second embodiment of the invention.
Figure 15:
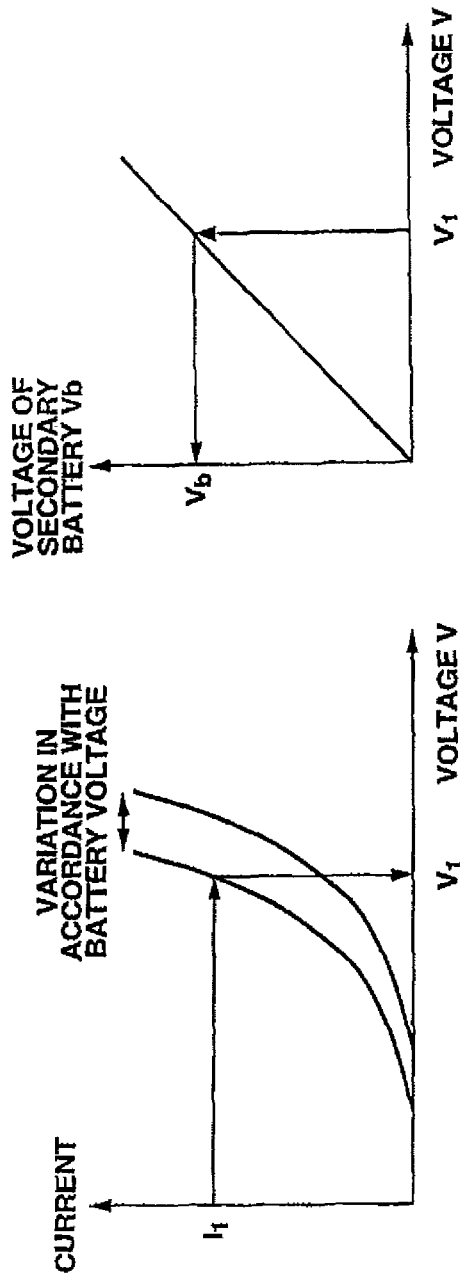
FIG. 15A is a graph showing a V-I characteristic of the secondary battery.
FIG. 15B is a graph showing a relation between a voltage V1 and a voltage Vb of the secondary battery.

The secondary battery system of the second embodiment as shown in FIG. 13 comprises secondary batteries 20_1 to 20__n having voltage values V1 to Vn, diodes 101, capacitors 10_1 to 10__n having capacitance values C1 to Cn, a DC/DC converter 105, a variable voltage power source 106, a single phase inverter 108, an ammeter 107, a battery control integrated circuit (IC) 104 and switches 109_1 to 109__n. DC/DC converter 105, variable voltage power source 106 and single phase inverter 108 constitute AC power source 102A.

Unlike the first embodiment, the circuit of FIG. 13 has no resistors. This is because wiring along which electric current flows for charging/discharging capacitors 10_1 to 10__n has an inevitable resistance that can be used as a resistor. However, if desired, like the first embodiment, resistors may be used.

The secondary batteries 20_1 to 20__n are the same in output specification as those of the first embodiment and constitute a united battery (i.e., a battery unit including a plurality of battery modules arranged and connected to one another). However, secondary batteries 20_1 to 20__n may be a plurality of battery elements (i.e., bi-polar type cells that are connected in series), a single battery cell unit (i.e., layer-built type secondary batteries each being sealed with a laminate film or bi-polar type secondary batteries), or a battery module (i.e., a plurality of single battery cell units arranged and connected to one another).

AC power source 102A is a device that is able to output at least pulses of a voltage-amplitude provided by adding a voltage of each of the fully charged secondary batteries 20_1 to 20__n to the threshold voltages of diodes 101a and 101b.

A voltage applied to DC/DC converter 105 is an output voltage of all of secondary batteries 20_1 to 20__n connected in series, and DC/DC converter 105 functions to lower that output voltage to a voltage level for variable voltage power source 106. For example, DC/DC converter 105 converts a voltage level of 400V provided by secondary batteries 20_1 to 20__n connected in series to a level of 12V.

Variable voltage power source 106 functions to convert the voltage output by DC/DC converter 105 (for example, 12V) to a desired voltage in accordance with a control signal from battery control IC 104. The desired voltage is a voltage (for example, 4V) that is provided by adding the threshold voltage of the two diodes 101a and 101b to the voltage of secondary batteries 20_1 to 20__n that are fully charged.

Single phase inverter 108 functions to convert the DC voltage from variable voltage power source 106 to AC voltage pulses. Single phase inverter 108 comprises upper and lower switches 108H and 108L that are connected in series. Upper and lower switches 108H and 108L are turned ON/OFF in accordance with respective control signals from battery control IC 104. By employing a control of "break before make", the turning of the two switches 108H and 108L is so made that once one switch is turned OFF, the other switch is turned ON. When upper switch 108H is in an ON condition and lower switch 108L is in an OFF condition, single phase inverter 108 issues Hi voltage that is equal to the voltage output from variable voltage power source 106. When lower switch 108L is in the ON condition and upper switch 108H is in the OFF condition, single phase inverter 108 issues Lo voltage that is equal to the voltage of the negative electrode of serially-connected secondary batteries 20_1 to 20_n. Accordingly, single phase inverter 108 functions to feed each of capacitors 10_1 to 10_n with an AC voltage that includes Hi voltage and Lo voltage.

Single phase inverter 108 functions to convert the DC voltage from variable voltage power source 106 to an AC voltage. Variable voltage power source 106 is also able to vary its output voltage. Accordingly, AC power source 102A that includes a combination of single phase inverter 108 and variable voltage power source 106 constitutes a variable voltage AC power source that can output a variable output voltage.

Preferably, the cycle of the AC voltage from AC power source 102 is a cycle that is smaller than 100 times the time constant determined by a capacitance value C1 to Cn of each capacitor 10_1 to 10_n and an electric resistance possessed by the electric circuit through which electric current flows for charging/discharging capacitors 10_1 to 10_n. After raising the charging current, the time for which the charging current is kept lowered can be shortened. Accordingly, the difference between the mean of the charging current and peak current can be reduced, and thus charging time can be shortened.

Ammeter 107 is disposed in series between variable voltage power source 106 and single phase inverter 108. By measuring the output current from AC power source 102A (that is, the output current from single phase inverter 108), ammeter 107 is able to measure the charging current to serially-connected secondary batteries 20_1 to 20_n. That is, ammeter 107 functions to measure the charging current to one or more than one of secondary batteries 20_1 to 20_n. More specifically, when upper switch 108H of single phase inverter 108 is turned ON, that is, when single phase inverter 108 issues Hi voltage, the charging current that flows through single phase inverter 108 and secondary batteries 20_1 to 20_n is measured.

Each of switches 109_1 to 109_n is disposed in series between a respective capacitor 10_1 to 10_n and single phase inverter 108. By selecting one of switches 109_1 to 109_n and causing the selected switch to be in the ON condition, only one of secondary batteries 20_1 to 20_n is brought to a condition to be charged through the selected switch. In the following, the secondary battery that is brought to a condition to be charged is referred to as the selected secondary battery 20. Of course, usage of two or more selected secondary batteries is possible. Each switch 109_1 to 109_n may be a MOSFET switch that is formed on a silicone semiconductor substrate, for example. If measurement of a voltage V1 to Vn of secondary batteries 20_1 to 20_n and charging of secondary batteries 20_1 to 20_n separately are not necessary, switches 109_1 to 109_n may be removed.

Battery control IC 104 functions to control variable voltage power source 106, ammeter 107, single phase inverter 108 and switches 109_1 to 109_n. Battery control IC 104 may be constructed of, for example, an ASIC (Application Specific Integrated Circuit) or a FPGA (Field Programmable Gate Array). Battery control IC 104 has therein a memory device that may be constructed of ROM (Read Only Memory) or RAM (Random Access Memory).

In the second embodiment, the AC power that charges secondary batteries 20_1 to 20_n is supplied from the entire arrangement of secondary batteries 20_1 to 20_n in the secondary battery system. In this connection, the flow of energy in the secondary battery system of the second embodiment is described with reference to FIG. 14.

The output voltage, such as 400V, of the entire arrangement of the secondary batteries 20_1 to 20_n connected in series is converted to, for example, 4V due to the functions of DC/DC converter 105 and variable voltage power source 106. The DC voltage thus converted is converted to an AC voltage due to the function of single phase inverter 108. Due to DC cutting or filtering by capacitors 10_1 to 10_n, an electric power is fed to secondary batteries 20_1 to 20_n, which are kept electrically insulated from one another (i.e., Insulated Power Transfer). Due to the rectification function of each diode 101, the AC voltage is converted to a DC voltage, and the charging current is fed to secondary batteries 20_1 to 20_n. Diode 101 connected to a lower voltage secondary battery is applied with a large voltage as compared with another diode 101 connected to a higher voltage secondary battery. Since the voltage-current characteristic of each diode 101 is exponential, a large amount of energy is returned from diode 101 that has a high voltage applied thereto to another diode 101 that has a smaller voltage applied thereto. DC/DC converter 105 is supplied with an electric power (i.e., energy) from the entire arrangement of serially-connected secondary batteries 20_1 to 20_n. Since the secondary battery system of the second embodiment uses this energy flow, there is no need of an external power source. That is, by discharging the entire arrangement of secondary batteries 20_1 to 20_n, energy to be consumed is produced and used for charging a low voltage battery. Thus, without the aid of an external power source, voltage balancing of the secondary batteries can be effectively made by the secondary battery system alone (for example, by the vehicle alone).

In the following, the method of measuring voltage V1 to Vn of each of secondary batteries 20_1 to 20_n that are connected in series according the second embodiment and the method of charging a secondary battery whose voltage is low is explained. When not referring to a particular secondary battery 20_1 to 20_n as the selected battery for measurement in the following description, the voltage of the selected battery is referred to as voltage Vb.

By making one of switches 109_1 to 109_n be in the ON condition with the aid of battery control IC 104, one of secondary batteries 20_1 to 20_n that is to be measured is brought to a condition to be charged. The voltage V of variable voltage power source 106 is increased at a constant speed, and single phase inverter 108 is operated. During this, electric current I measured by ammeter 107 is sampled to gain a relationship (referred to as the VI characteristic hereinafter) between the voltage V and the current I and the relationship is stored in battery control IC 104. If desired, the voltage V may be a control voltage that is supplied from battery control IC 104 to variable voltage power source 106.

As is seen from the graph of FIG. 15A, the VI characteristic varies in accordance with battery voltage Vb. The current I measured by ammeter 107 is a charging current used for charging each of secondary batteries 20_1 to 20_n, and the charging current is fed to the selected one of the secondary batteries through a corresponding diode 101b. Since diode 101b connected to the selected secondary battery is applied with a large voltage, the charging current that flows through diode 101b increases irrespective of battery voltage Vb.

From the VI characteristic thus gained, a voltage $V_1$ at a given current $I_1$ is checked and compared with a previously prepared data table that shows the relation between voltage $V_1$ and voltage Vb of the secondary battery to find the voltage Vb of the selected secondary battery. FIG. 15B is a graph showing the relation between voltage $V_1$ and voltage Vb of the secondary battery.

Like the above, voltage V1 to Vn of all of secondary batteries 20_1 to 20_n is measured. Then, only one of secondary batteries 20_1 to 20_n that has a low voltage Vb is brought to a condition to be charged. That is, one of the switches 109_1 to 109_n that is in association with the selected one of the secondary batteries 20_1 to 20_n is turned ON. By battery control IC 104, a charging time for which the charging operation is kept is predetermined, and the voltage of variable voltage power source 106 is predetermined to a suitable value. Then, by operating single phase inverter 108, the charging of the selected secondary battery is started. With such steps, only the selected secondary battery whose voltage has been lowered can be charged.

As is mentioned hereinabove, in the second embodiment, during charging of a selected secondary battery, the voltage of the other secondary batteries 20_1 to 20_n is measured. And if battery control IC 104 judges that the charging to the selected secondary battery has finished, the one of switches 109_1 to 109_n in the charging line for the selected secondary battery is turned OFF. Thereafter, charging of the other secondary batteries is carried out in substantially the same manner. That is, in this embodiment, the accuracy for controlling the voltage balancing of the secondary batteries is determined by the precision of battery control IC 104 not by the charging circuit, thus increasing charging accuracy. By charging only a selected secondary battery that has a lower voltage Vb, balancing the voltage of secondary batteries 20_1 to 20_n can be achieved.

While changing the charging voltage for every secondary battery, the charging current is measured, so that from the V-I characteristic of each secondary battery, a needed voltage for effectively charging the battery is found. Thus, the battery control circuit has no need to provide a function to measure the voltage of the secondary batteries, and thus, reduction in cost of the secondary battery system can be realized.

If the measured V-I characteristic shows an abnormal phenomenon, that is, if the measured V-I characteristic is largely different from the V-I characteristic shown in the graph of FIG. 15A (which tends to occur when the charging current is not present), it can be determined that an electric circuit extending from variable voltage power source 106 to each of secondary batteries 20_1 to 20_n has a problem. Accordingly, in the second embodiment, any problems that may occur in the electric circuit from variable voltage power source 106 to each of secondary batteries 20_1 to 20_n can be detected, which increases reliability of the secondary battery system of the invention.

Figure 16:
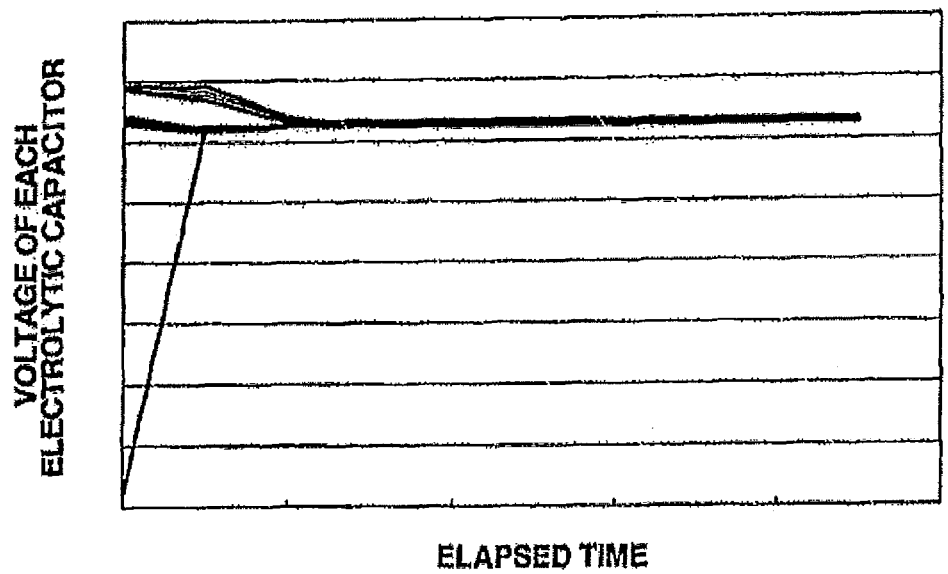
FIG. 16 is a graph showing the results of an experiment in which a charging was applied to a circuit in which the secondary batteries connected in series of the secondary battery system of the second embodiment are replaced with 32 electrolytic capacitors connected in series.

FIG. 16 is a graph showing the results of an experiment in which charging was applied to a circuit in which secondary batteries connected in series as described herein are replaced with 32 (thirty two) electrolytic capacitors connected in series. The electrolytic capacitor changes the voltage when accumulating electric charge, which is similar to each secondary battery. Accordingly, the effects of the invention can be considered by replacing the secondary batteries with the electrolytic capacitors.

The capacitor having a high voltage is charged through a small electric current and the capacitors connected in series carry out an entire discharging, and thus as a result the capacitor having the high voltage is discharged. The capacitor having a low voltage is, as a result, charged. Accordingly, in the second embodiment of the invention, the voltages of the electrolytic capacitors can be balanced quickly as is shown in the graph of FIG. 16.

The secondary battery system of the second embodiment has the following advantages in addition to the advantages possessed by the first embodiment.

When discharging electricity, the secondary batteries connected in series become an electric power source by which the battery with a low voltage can be charged. Accordingly, there is no need to connect the secondary batteries with an external power device, and thus, balancing of the charging condition of the secondary batteries is effectively achieved with the secondary battery system alone (i.e., the vehicle alone).

The voltage of each secondary battery is measured during charging, and when the battery control IC judges that the charging of the secondary battery is completed, the switch in the charging circuit for the charged secondary battery is turned OFF, thereby finishing the charging of the secondary battery. Since the control accuracy of the voltage balance of the secondary batteries is determined by the precision of the battery control IC not by the charging circuit, charging accuracy can be increased.

Problems with the charging circuit can be detected by the ammeter, and thus, the reliability of the secondary battery system is increased.

The charging current can be measured by varying the charging voltage for each secondary battery, and from the V-I characteristic of each secondary battery the voltage of a selected secondary battery can be found. With this measure, it becomes possible to remove the function of measuring the voltage of the secondary batteries from the battery control circuit, which reduces the cost of the secondary battery system.

In the following, a third embodiment of a secondary battery system of the invention is described in detail with reference to FIGS. 17-19.

In this embodiment, the secondary batteries connected in series are divided into several blocks for charging the blocks.

Figure 17:
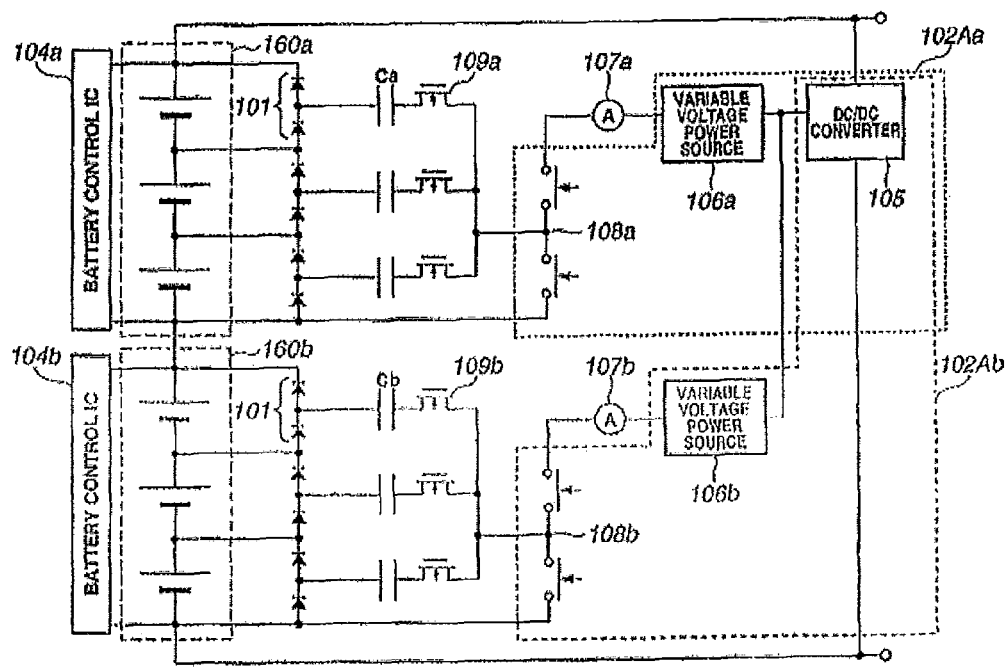
FIG. 17 is a schematic view of a circuit showing the construction of the secondary battery system according to a third embodiment of the invention.

As is shown in FIG. 17, the secondary battery system of this third embodiment comprises secondary batteries 20_1 to 20_n connected in series and into a first battery block 160a and a second battery block 160b. The first and second battery blocks 160a and 160b are provided with a first battery control IC 104a and a second battery control IC 104b, respectively. First battery control IC 104a and second battery control IC 104b are arranged to be fed with electric power from the first battery block 160a and second battery block 160b, respectively. First battery control IC 104a controls a first variable AC voltage power source 106a, a first ammeter 107a, a first single phase inverter 108a and first switches 109a. While, second battery control IC 104b controls a second variable AC voltage power source 106b, a second ammeter 107b, a second single phase inverter 108b and second switches 109b.

DC/DC converter 105, first variable AC voltage power source 106a and first single phase inverter 108a constitute a first alternating current power source 102Aa.

DC/DC converter 105 feeds both first and second variable voltage power sources 106a and 106b with a common voltage. For example, a voltage 12V provided by converting the output voltage of the serially-connected secondary batteries 20_1 to 20_n is commonly fed to variable voltage power sources 106a and 106b.

First variable voltage power source 106a functions to convert the voltage from DC/DC converter 105 to a desired voltage in accordance with a control signal from first battery control IC 104a. The desired voltage is a voltage (for example, 4V) that is provided by adding threshold voltages of the two diodes 101a and 101b to a voltage of each of secondary batteries 20_1 to 20_n as fully charged. The desired voltage is also based on the power source of first battery control IC 104a. That is, the reference potential of the output voltage of first variable voltage power source 106a is equal to the reference potential of first battery control IC 104a (for example, the potential of the negative electrode of first battery control IC 104a).

First single phase inverter 108a functions to convert the DC voltage from first variable voltage power source 106a to AC voltage pulses. The reference potential of the output voltage pulse of the first single phase inverter 108a is equal to the reference potential of the first battery control IC 104a.

Since the reference potential of the output voltage pulse of first single phase inverter 108a is equal to the reference potential of first battery control IC 104a, the potential applied to each capacitor Ca is not lower than the reference potential of first battery control IC 104a. The other potential applied to each of capacitors Ca is not higher than the potential that is provided by adding the threshold voltage of diode 101 to the power potential of first battery control IC 104a (i.e., the potential of the positive electrode of first battery block 160a). With this, the voltage applied to each capacitor Ca arranged between first single phase inverter 108a and first battery control IC 104a becomes equal to the power source voltage of first battery control IC 104a (more specifically, the voltage provided by adding the threshold voltage of diode 101 to the power source voltage).

The power source voltage of first battery control IC 104a can be reduced by dividing the secondary batteries connected in series into blocks. Accordingly, in the embodiment, the characteristics (e.g. capacitor type, dielectric constant, plate spacing etc.) of each capacitor Ca for the DC cutting, or filtering, can be controlled to a range of the output voltage of first battery block 160a. Thus, the side of each capacitor can be reduced, and thus reduction in cost of the system is achieved.

Like the above, DC/DC converter 105, second variable AC voltage power source 106b and second single phase inverter 108b constitute a second AC power source 102Ab.

Second variable voltage power source 106b converts the voltage from DC/DC converter 105 to a desired voltage in accordance with the control signal from second battery control IC 104b. The desired voltage is a voltage (for example, 4V) that is provided by adding the threshold voltages of the two diodes 101a and 101b to the voltage of each of secondary batteries 20_1 to 20_n as fully charged. The desired voltage is also based on the power source of second battery control IC 104b. That is, the reference potential of the output voltage of second variable voltage power source 106b is equal to the reference potential of second battery control IC 104b (for example the potential of the negative electrode of second batter control IC 104b). Of course, the reference potential of second battery control IC 104b is different from the reference potential of first battery control IC 104a.

Second single phase inverter 108b functions to convert the DC voltage from second variable voltage power source 106, to AC voltage pulses. The reference potential of the output voltage pulse of second single phase inverter 108b is equal to the reference potential of second battery control IC 104b.

Since the reference potential of the output voltage pulse of second single phase inverter 108b is equal to the reference potential of second battery control IC 104b, the potential applied to each capacitor Cb is not lower than the reference potential of second battery control IC 104b. The other potential applied to each of capacitors Cb is not higher than the potential that is provided by adding the threshold voltage of diode 101 to the potential of second battery control IC 104b (i.e., the potential of the positive electrode of second battery block 160b). With this, the voltage applied to capacitor Cb arranged between second single phase inverter 108b and second battery control IC 104b becomes equal to the power source voltage of second battery control IC 104b (more specifically, the voltage provided by adding the threshold voltage of diode 101 to the power source voltage).

The power source voltage of second battery control IC 104b can be reduced by dividing the serially-connected secondary batteries into blocks. Accordingly, the characteristics of each capacitor Cb for the DC cutting, or filtering can be controlled to a range of the output voltage of second battery block 160b.

In the secondary battery system shown in FIG. 17, each first switch 109a is arranged between a respective capacitor Ca and first alternating current power source 102Aa. Like this, each second switch 109b is arranged between a respective capacitor Cb and second alternating current power source 102Ab. By arranging switch 109a or 109b between a respective capacitor Ca or Cb for DC cutting, or filtering, and an AC power source, the potential varying range of the drive signal of switch 109a or 109b can be commonly used as a voltage signal that is similar to the reference potential of the battery control circuit. With this, there is no need to produce a drive signal that has a plurality of potential varying ranges for a level shift circuit or the like. Thus, reduction in cost of the system can be realized.

It is to be noted that the position of each switch 109a or 109b is not limited to the described position so long as switch 109a or 109b is placed between each secondary battery and each AC power source.

Figure 18:
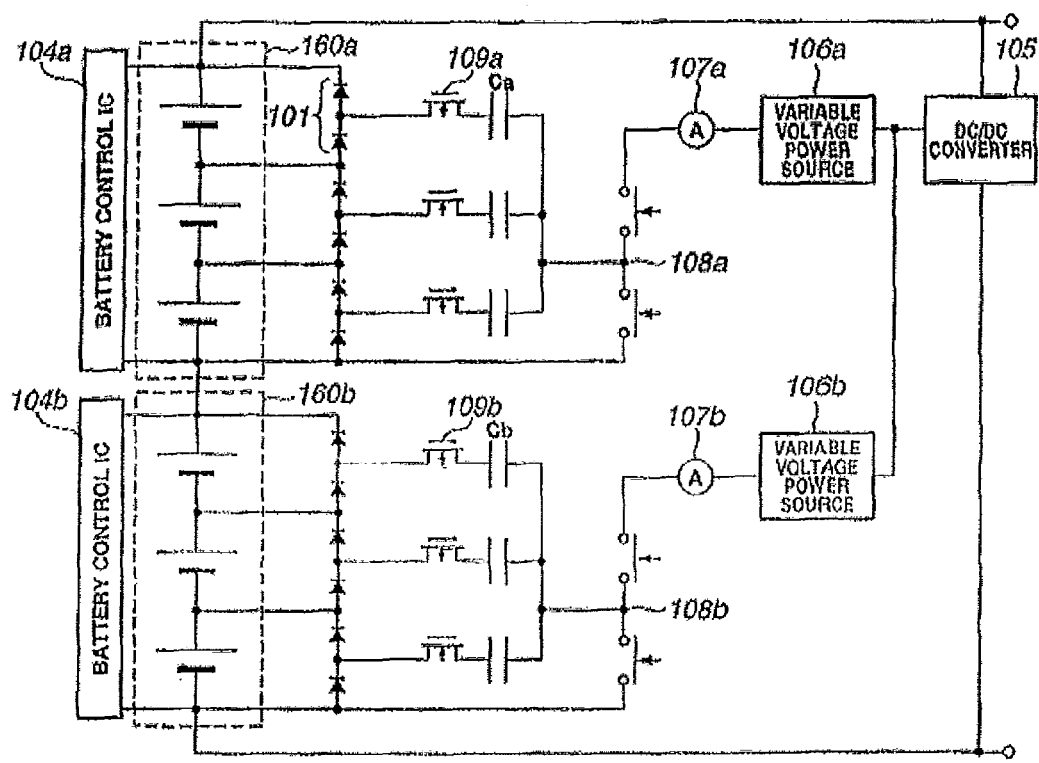
FIG. 18 is a schematic view of a circuit showing a first variation of the construction of the secondary battery system of the third embodiment wherein each switch is arranged between a junction portion between the cathode of a first diode and the anode of a second diode and the capacitor.

FIG. 18 is an arrangement of the secondary battery system in a case wherein each switch 109a or 109b is arranged between a junction portion between the cathode of first diode 101a and the anode of second diode 101b and a respective capacitor Ca or Cb.

Figure 19:
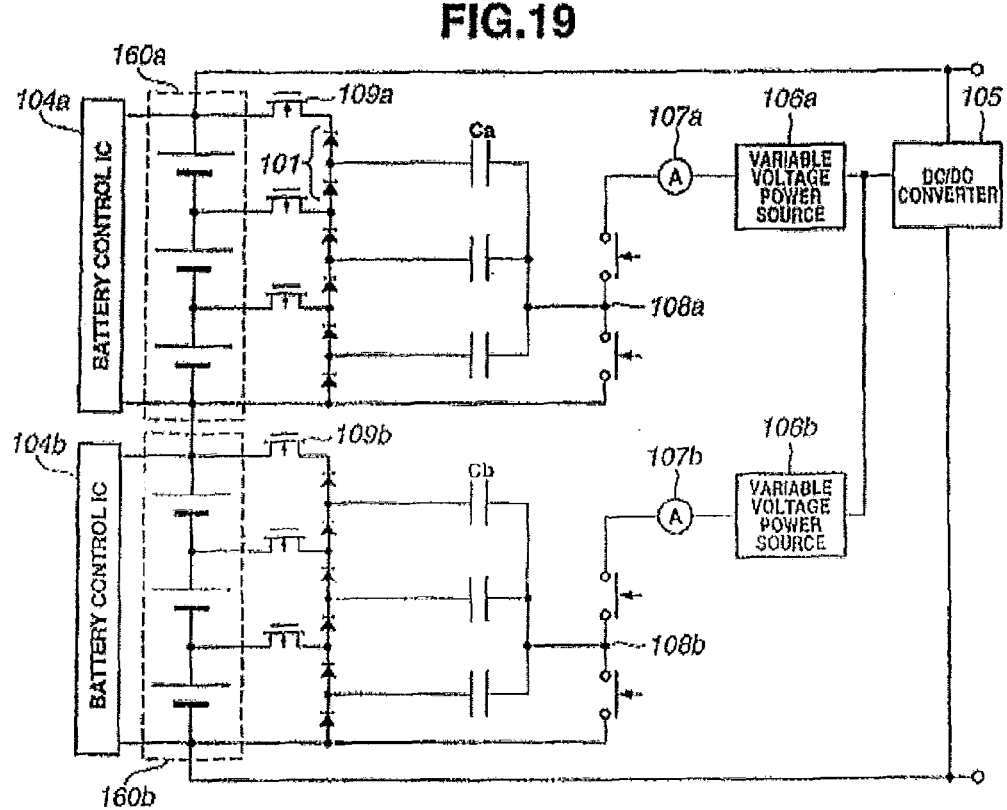
FIG. 19 is a schematic view of a circuit showing a second variation of the construction of the secondary battery system of the third embodiment wherein each switch is arranged between the cathode of a second diode and the positive electrode of each secondary battery.

FIG. 19 is an arrangement of the secondary battery system in a case wherein each switch 109a or 109b is arranged between the cathode of second diode 101b and the positive electrode of each respective secondary battery.

In the secondary battery systems shown in FIGS. 18 and 19, each switch 109a or 109b is arranged between a secondary battery and an AC power source. Since the explanation of these secondary battery systems overlaps with that of the secondary battery system of FIG. 17, the explanation is omitted.

In the third embodiment, description is directed to the arrangement in which secondary batteries 20_1 to 20_n are connected in series and are divided into first battery block 160a and second battery block 160b. However, if desired, secondary batteries 20_1 to 20_n may be divided into three or more blocks.

The secondary battery system of the third embodiment has the following advantages in addition to the advantages possessed by the second embodiment. A plurality of secondary batteries connected in series is divided into a plurality of blocks, and the charging operation is carried out within the range of the output voltage of a battery block. Thus, the characteristics of each capacitor Ca, Cb for DC cutting, or filtering, can be controlled to the range of the output voltage of the battery block. Thus, the size of capacitors can be reduced and thus reduction in cost of the system is realized.

By arranging each switch between a capacitor Ca, Cb used for DC cutting, or filtering, and the AC power source, the drive signal for the switches can be commonly used as the voltage signal that is similar to the reference potential of the battery control circuit. Thus, there is no need to produce a drive signal that has a plurality of potential varying ranges for a level shift circuit or the like. Thus, reduction in cost of the system can be realized.

The above-described embodiments have been described in order to allow understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A secondary battery system comprising:
    a plurality of secondary batteries connected in series, each having a positive electrode and a negative electrode;
    a plurality of first diodes, each having an anode and a cathode, the anode being connected to the negative electrode of a corresponding secondary battery;
    a plurality of second diodes, each having an anode and a cathode, the cathode being connected to the positive electrode of the corresponding secondary battery, and the anode being connected to the cathode of a corresponding one of the plurality of first diodes;
    a plurality of capacitors connected to a plurality of junction portions, each junction portion being a connection between the cathode of a first diode of the plurality of first diodes and the anode of a second diode of the plurality of second diodes;
    at least one resistor for charging and discharging the plurality of capacitors; and
    an alternating current power source connected to the junction portions through the plurality of capacitors, the alternating current power source selectively operating to produce an alternating current voltage;
    wherein the alternating current power source has a cycle of the alternating current voltage that is less than 100 times a time constant provided by multiplying a resistance value of the at least one resistor and a capacitance value of each of the plurality of capacitors.

2. The secondary battery system of claim 1, wherein the at least one resistor is arranged between the plurality of capacitors and the alternating current power source.

3. The secondary battery system of claim 1, wherein each of the plurality of capacitors is selected from a group that includes a ceramic capacitor, an aluminum electrolytic capacitor and a plastic film capacitor.

4. The secondary battery system of claim 1, further comprising a control circuit that, responsive to a difference between a highest detected voltage and a lowest detected voltage of the at least two secondary batteries connected in series is higher than 50 mV, controls the alternating current power source to output the alternating current voltage.

5. The secondary battery system of claim 4, wherein the control circuit varies an operation time of the alternating current power source in accordance with the difference between the highest detected voltage and the lowest detected voltage.

6. The secondary battery system of claim 1, further comprising an inverter to which electric power is fed from the plurality of secondary batteries connected in series, wherein when the inverter stops operating, the alternating current power source operates to produce the alternating current voltage.

7. The secondary battery system of claim 1, further comprising a metal case that covers the plurality of secondary batteries connected in series, wherein the plurality of first diodes and the plurality of second diodes are arranged at a position within 10 mm from the metal case.

8. The secondary battery system of claim 1, wherein the alternating current power source further comprises a lower voltage producing section connected to receive an output voltage of all of the secondary batteries connected in series and that functions to produce a lower voltage.

9. The secondary battery system of claim 1, wherein the plurality of secondary batteries connected in series is divided into a plurality of battery blocks and battery control circuits that use a corresponding one of the plurality of battery blocks as the power source; and wherein each of the battery control circuits provides a control signal to the alternating current power source to produce the alternating current voltage using the power source as a reference potential.

10. The secondary battery system of claim 1, further comprising a plurality of switches located between the plurality of secondary batteries and the alternating current power source.

11. The secondary battery system of claim 10, wherein each of the plurality of switches is provided between at least one of the plurality of capacitors and the alternating current power source.

12. The secondary battery system of claim 1, further comprising an ammeter for measuring an output current from the alternating current power source.

13. The secondary battery system of claim 1, wherein the alternating current power source is a variable voltage alternating current power source that can vary its output voltage.

14. The secondary battery system of claim 8, wherein the lower voltage producing section comprises a DC/DC converter.

15. The secondary battery system of claim 1, wherein the alternating current power source uses the plurality of secondary batteries as a power source, and wherein the alternating current power source comprises an inverter that functions to convert an output voltage of all of the secondary batteries to the alternating current voltage.

* * * * *